US011572099B2

United States Patent
D'sa et al.

(10) Patent No.: US 11,572,099 B2
(45) Date of Patent: *Feb. 7, 2023

(54) MERGE BEHAVIOR SYSTEMS AND METHODS FOR MERGING VEHICLES

(71) Applicant: Honda Motor Co., Ltd., Tokyo (JP)

(72) Inventors: Jovin D'sa, Ann Arbor, MI (US); Samer Rajab, Novi, MI (US); Shigenobu Saigusa, West Bloomfield, MI (US); Xue Bai, Novi, MI (US); R. Michael Van Auken, Mission Viejo, CA (US); Alex J. Chapman, Los Angeles, CA (US)

(73) Assignee: Honda Motor Co., Ltd., Tokyo (JP)

( * ) Notice: Subject to any disclaimer, the term of this patent is extended or adjusted under 35 U.S.C. 154(b) by 530 days.

This patent is subject to a terminal disclaimer.

(21) Appl. No.: 15/965,399

(22) Filed: Apr. 27, 2018

(65) Prior Publication Data

US 2019/0329778 A1    Oct. 31, 2019

(51) Int. Cl.
*B62D 15/02*    (2006.01)
*B60W 30/18*    (2012.01)
(Continued)

(52) U.S. Cl.
CPC .......... *B62D 15/025* (2013.01); *B60W 30/16* (2013.01); *B60W 30/18163* (2013.01); (Continued)

(58) Field of Classification Search
CPC .......... B60W 30/18163; B60W 30/16; B60W 40/04; G06N 20/00; G06N 5/003;
(Continued)

(56) References Cited

U.S. PATENT DOCUMENTS 5,521,579 A    5/1996    Bernhard
5,761,630 A    6/1998    Sekine et al.
(Continued)

FOREIGN PATENT DOCUMENTS

CN    105912814    8/2016

OTHER PUBLICATIONS

Office Action of U.S. Appl. No. 15/965,411 dated Jun. 4, 2020, 14 pages.
(Continued)

*Primary Examiner* — Jeffrey C Boomer
(74) *Attorney, Agent, or Firm* — Rankin, Hill & Clark LLP

(57) ABSTRACT

A merge behavior system assists a host vehicle positioned in a merge lane that is adjacent a mainline lane. The merge behavior system includes an identification module that identifies at least one proximate vehicle in the mainline lane, if present. The merge behavior system also includes a prediction module that selects one or more models based on the at least one proximate vehicle, calculates one or more merge factors corresponding to the one or more models, and predicts a merge location based on the one or more merge factors. The merge behavior system further includes a control module that adjusts a kinematic parameter of the host vehicle to bring the host vehicle within a merging distance of the predicted merge location. The merge behavior system includes a merge module that determines whether a gap at the predicted merge location is a sufficient size for the host vehicle.

15 Claims, 10 Drawing Sheets

(51) Int. Cl.
- *B60W 30/16* (2020.01)
- *B60W 40/04* (2006.01)
- *G06N 20/20* (2019.01)
- *G06V 20/56* (2022.01)
- *G06N 5/00* (2006.01)
- *G06N 20/10* (2019.01)

(52) U.S. Cl.
CPC ......... *B60W 40/04* (2013.01); *B62D 15/0255* (2013.01); *G06N 20/20* (2019.01); *G06V 20/56* (2022.01); *G06N 5/003* (2013.01); *G06N 20/10* (2019.01)

(58) Field of Classification Search
CPC .... G06N 20/20; G06N 20/10; B62D 15/0255; B62D 15/025; G06K 9/00791
See application file for complete search history.

(56) References Cited

U.S. PATENT DOCUMENTS

| | | | |
|---|---|---|---|
| 8,788,134 | B1 | 7/2014 | Litkouhi et al. |
| 9,187,117 | B2 | 11/2015 | Spero et al. |
| 9,443,153 | B1 | 9/2016 | Gupta et al. |
| 9,475,491 | B1 | 10/2016 | Nagasaka et al. |
| 9,643,650 | B2 | 5/2017 | Sim |
| 9,738,280 | B2 | 8/2017 | Rayes |
| 10,114,371 | B2 | 10/2018 | Asakura et al. |
| 10,255,528 | B1 | 4/2019 | Nguyen |
| 10,449,967 | B1 | 10/2019 | Ferguson |
| 10,997,862 | B2 | 5/2021 | Fukushige et al. |
| 2006/0095193 | A1 | 5/2006 | Nishira et al. |
| 2013/0338868 | A1 | 12/2013 | Essame et al. |
| 2015/0166062 | A1 | 6/2015 | Johnson et al. |
| 2017/0076607 | A1 | 3/2017 | Linder et al. |
| 2017/0096139 | A1 | 4/2017 | Christensen et al. |
| 2017/0120912 | A1* | 5/2017 | Ishioka ............. B60W 30/16 |
| 2017/0235307 | A1 | 8/2017 | Asakura et al. |
| 2017/0320521 | A1 | 11/2017 | Fujita |
| 2017/0369052 | A1* | 12/2017 | Nagy ............. B60W 30/14 |
| 2018/0174457 | A1 | 6/2018 | Taylor |
| 2018/0208195 | A1 | 7/2018 | Hutcheson et al. |
| 2019/0072965 | A1 | 3/2019 | Zhang et al. |
| 2019/0072966 | A1 | 3/2019 | Zhang et al. |
| 2019/0072973 | A1 | 3/2019 | Sun et al. |
| 2019/0163181 | A1* | 5/2019 | Liu ............. G05D 1/0287 |
| 2020/0388157 | A1 | 12/2020 | Fukushige et al. |

OTHER PUBLICATIONS

Office Action of U.S. Appl. No. 15/965,411 dated Sep. 23, 2020, 10 pages.

Kuehn et al., "Public Roads", U.S. Department of Transporation Federal Highway Administration, Jan. 31, 2017, 8 pages.

Marczak et al., "Key Variables of Merging Behaviour: Empirical Comparison Between Two Sites and Assessment of Gap Acceptance Theory", Science Direct, Procedia—Social and Behavrioral Sciences, vol. 80, Jun. 7, 2013, pp. 678-697.

Patriarca et al., "Analysis of the Risks and Benefits of New Chemical Entities Approved by the US Food and Drug Administration (FDA) and Subsequently Withdrawn From the US Market", Therapeutic Innovation & Regulatory Science, 2018, 7 pages.

Tanida, "Analysis of Merging Behaviour at Expressway Merging Sections" (HGT research document), Proceedings of the 2016 International Conference on Traffic and Transport Psychology, Aug. 2-5, 2016, Brisbane, AU, 2 pages.

Van Auken et al., "On-demand driver vigilance enhancement without explicit drowsiness detection—Further analysis of the pilot study results", Traffic Injury Prevention, vol. 18, No. 1, 2017, pp. S64-S70.

Yi et al., "Data-driven Situation Awareness Algorithm for Vehicle Lane Change", Intelligent Transporation Systems (ITSC), 2016 IEEE 19th International Conference, Nov. 1-4, 2016, 4 pages.

Office Action of U.S. Appl. No. 15/965,411 dated Feb. 1, 2021, 13 pages.

Notice of Allowance of U.S. Appl. No. 15/965,411 dated May 17, 2021, 10 pages.

* cited by examiner

MERGE BEHAVIOR SYSTEMS AND METHODS FOR MERGING VEHICLES

CROSS-REFERENCE TO RELATED APPLICATIONS

This application is related to the U.S. Non-Provisional Patent Application entitled "MERGE BEHAVIOR SYSTEMS AND METHODS FOR MAINLINE VEHICLES," Serial No. not yet assigned, filed on Apr. 27, 2018; the entirety of the above-noted application is incorporated by reference herein.

BACKGROUND

Merging is one of the most stressful driving scenarios for drivers and is considered a major bottleneck in highway driving. Merging occurs when a vehicle in one lane moves laterally into an adjacent lane of traffic. The driver of the merging vehicle must decide whether the merge is possible based on the relative location and speed of the vehicles already in the adjacent lane. For example, a driver has to determine if a gap in the traffic is available.

This is further complicated in congested traffic scenarios when a gap in the traffic is not readily available. In such congested scenarios, the driver may have to rely on drivers of mainline vehicles already in the adjacent lane to create a gap thereby initiating a courtesy merge. Accordingly, the driver of the merging vehicle must gauge the position and speed of the vehicles already in the adjacent lane and still may not be able to determine if a merge will be possible. Likewise, a driver of a mainline vehicle can only guess whether the merging vehicle is going to attempt to merge ahead of or behind the mainline vehicle. Thus, merging is stressful for the drivers of both the merging vehicle and the mainline vehicle.

BRIEF DESCRIPTION

According to one or more aspects, a merge behavior system assists a host vehicle positioned in a merge lane that is adjacent to a mainline lane. The merge behavior system includes an identification module that identifies at least one proximate vehicle in the mainline lane. The merge behavior system also includes a prediction module that selects one or more models based on the at least one proximate vehicle, calculates one or more merge factors corresponding to the one or more models, and predicts a merge location based on the one or more merge factors. The merge behavior system further includes a merge module that determines whether a gap at the predicted merge location is a sufficient size for the host vehicle. In response to determining that the gap has a sufficient size, the merge module initiates a merge maneuver.

According to one or more aspects, a merge behavior system assists a host vehicle positioned in a merge lane that is adjacent to a mainline lane. The merge behavior system includes an identification module that identifies at least one proximate vehicle in the mainline lane. The merge behavior system also includes a prediction module that selects one or more models based on a relative location of the at least one proximate vehicle to the host vehicle, and predicts a merge location based on the one or more models. The merge location is ahead or behind the at least one proximate vehicle. The merge behavior system also includes a control module that adjusts a kinematic parameter of the host vehicle to bring the host vehicle within a merging distance of the predicted merge location. The merge behavior system also includes a merge module that determines whether a gap at the predicted merge location is a sufficient size for the host vehicle. In response to determining that the gap has a sufficient size, the merge module initiates a merge maneuver.

According to one or more aspects, a merge behavior method for assisting a host vehicle positioned in a merge lane that is adjacent to a mainline lane is described. The merge behavior method includes identifying at least one proximate vehicle in the mainline lane. One or more models are selected based on the at least one proximate vehicle. The merge behavior method further includes calculating one or more merge factors corresponding to the one or more models. A merge location is predicted based on the one or more merge factors. A kinematic parameter of the host vehicle is adjusted to bring the host vehicle within a merging distance of the predicted merge location. The merge behavior method also includes determining whether a gap at the predicted merge location is a sufficient size for the host vehicle. In response to determining that the gap has a sufficient size, the merge module initiates a merge maneuver.

DETAILED DESCRIPTION

Figure 1:
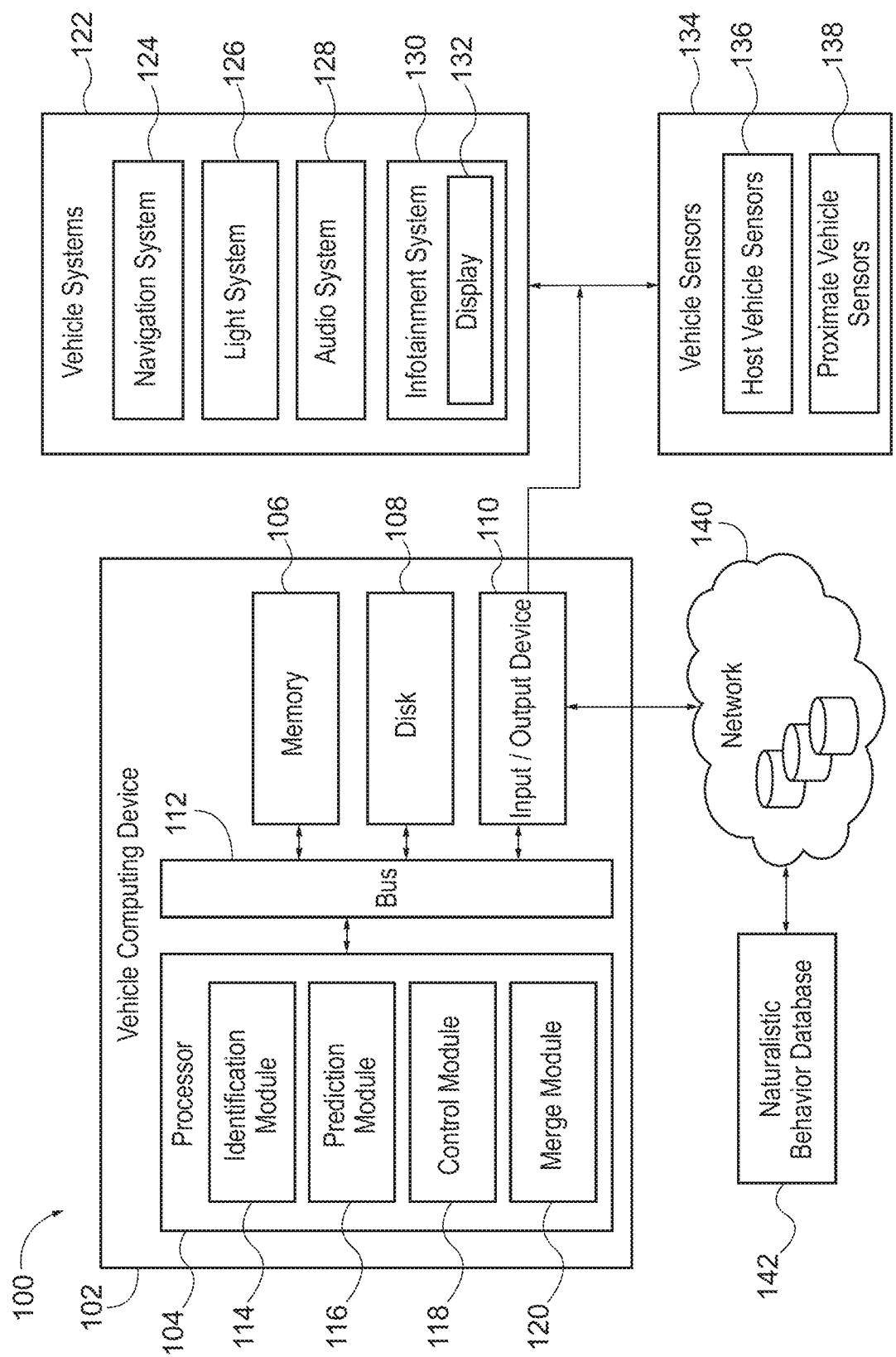
FIG. 1 is a schematic diagram of an operating environment for implementing systems and methods for predicting merge behavior according to an exemplary embodiment.

Generally, the systems and methods disclosed herein are directed to vehicle control integrating data from a host vehicle and vehicle sensors to predict merge behavior from the perspective of the host vehicle. The host vehicle may be a merging vehicle merging from a merge lane into an adjacent mainline lane or a mainline vehicle in the mainline lane facilitating the merge of the merging vehicle. The merge behavior systems and methods predict a merge location for a merging vehicle based on naturalistic datasets that approximate human behavioral outcomes to provide smooth merge assistance.

Definitions

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to other computer components inside a computer or between computers. The bus can transfer data between the computer components. The bus can be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication," as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk," as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "database," as used herein can refer to table, a set of tables, a set of data stores and/or methods for accessing and/or manipulating those data stores. Some databases can be incorporated with a disk as defined above.

A "memory," as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Obstacle", as used herein, refers to any objects in the roadway and may include pedestrians crossing the roadway, other vehicles, animals, debris, potholes, etc. Further, an 'obstacle' may include most any traffic conditions, road conditions, weather conditions, etc. Examples of obstacles may include, but are not necessarily limited to other vehicles (e.g., obstacle vehicle), buildings, landmarks, obstructions in the roadway, road segments, intersections, etc. Thus, obstacles may be found, detected, or associated with a path, one or more road segments, etc. along a route on which a vehicle is travelling or is projected to travel along.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor," as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle may or may not carry one or more human occupants. Further, the term "vehicle" can include vehicles that are automated or non-automated with pre-determined paths or free-moving vehicles.

A "vehicle system," as used herein can include, but is not limited to, any automatic or manual systems that can be used to enhance the vehicle, driving, and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic seat belt pretensioning system, a monitoring system, a passenger detection system, a vehicle suspension system, a vehicle seat configuration system, a vehicle cabin lighting system, an audio system, a sensory system, among others.

A "vehicle occupant," as used herein can include, but is not limited to, one or more biological beings located in the vehicle. The vehicle occupant can be a driver or a passenger of the vehicle. The vehicle occupant can be a human (e.g., an adult, a child, an infant) or an animal (e.g., a pet, a dog, a cat).

System Overview

Referring now to the drawings, wherein the showings are for purposes of illustrating one or more exemplary embodiments and not for purposes of limiting same, FIG. 1 is a schematic diagram of an operating environment 100 for predicting merge behavior. The components of operating environment 100, as well as the components of other systems, hardware architectures, and software architectures discussed herein, can be combined, omitted, or organized into different architectures for various embodiments. Further, the components of the operating environment 100 can be implemented with or associated with a host vehicle, such as example host vehicle 300 (shown in FIG. 3).

In the illustrated embodiment of FIG. 1, the operating environment 100 includes a vehicle computing device (VCD) 102 with provisions for processing, communicating and interacting with various components of a vehicle and other components of the operating environment 100. In one embodiment, the VCD 102 can be implemented with the example host vehicle 300 (FIG. 3), for example, as part of a telematics unit, a head unit, a navigation unit, an infotainment unit, an electronic control unit, among others. In other embodiments, the components and functions of the VCD 102 can be implemented remotely from the example host vehicle 300, for example, with a portable device (not shown) or another device connected via a network (e.g., a network 140).

Generally, the VCD 102 includes a processor 104, a memory 106, a disk 108, and an input/output (I/O) interface 110, which are each operably connected for computer communication via a bus 112 and/or other wired and wireless technologies. The I/O interface 110 provides software and hardware to facilitate data input and output between the components of the VCD 102 and other components, networks, and data sources, which will be described herein. Additionally, the processor 104 includes an identification module 114, a prediction module 116, a control module 118, and merge module 120, for assisting a host vehicle in predicting merge locations, facilitated by the components of the operating environment 100.

The VCD 102 is also operably connected for computer communication (e.g., via the bus 112 and/or the I/O interface 110) to one or more vehicle systems 122. The vehicle systems 122 can include, but are not limited to, any automatic or manual systems that can be used to enhance the vehicle, driving, and/or safety. Here, the vehicle systems 122 include a navigation system 124, a light system 126, an audio system 128, and an infotainment system 130 according to an exemplary embodiment. The navigation system 124 stores, calculates, and provides route and destination information and facilitates features like turn-by-turn directions. The light system 126 controls the lights of the vehicle to actuate, including, for example, interior lights such as the dashboard lights and/or exterior lights, such as lights mounted on the side view mirrors of the example host vehicle 300. The audio system 128 controls audio (e.g., audio content, volume) in the example host vehicle 300. The infotainment system 130 provides visual information and/or entertainment and can include a display 132.

The vehicle systems 122 include and/or are operably connected for computer communication to various vehicle sensors 134. The vehicle sensors 134 provide and/or sense information associated with the vehicle, the vehicle environment, and/or the vehicle systems 122. The vehicle sensors 134 can include, but are not limited to, host vehicle sensors 136 associated with the vehicle systems 122, other vehicle sensors associated with the example host vehicle 300, and/or proximate vehicle sensors 138 that collect data regarding proximate vehicles that are proximate to the example host vehicle 300.

The host vehicle sensors 136 can include, but are not limited to, environmental sensors, vehicle speed sensors, accelerator pedal sensors, brake sensors, throttle position sensors, wheel sensors, anti-lock brake sensors, camshaft sensors, among others. In some embodiments, the host vehicle sensors 136 are incorporated with the vehicle systems 122. For example, one or more host vehicle sensors 136 may be incorporated with the navigation system 124 to monitor characteristics of the host vehicle, such as location and speed.

The proximate vehicle sensors 138 can include, but are not limited to, image sensors, such as cameras, optical sensors, radio sensors, etc. mounted to the interior or exterior of the example host vehicle 300 and light sensors, such as light detection and ranging (LiDAR) sensors, radar, laser sensors etc. mounted to the exterior of the example host vehicle 300. Further, proximate vehicle sensors 138 can include sensors external to the example host vehicle 300 (accessed, for example, via the network 140), for example, external cameras, radar and laser sensors on other vehicles in a vehicle-to-vehicle network, street cameras, surveillance cameras, among others. The proximate vehicle sensors monitor the environment of the example host vehicle 300 to detect the presence of proximate vehicle. Additionally, the proximate vehicle sensors 138 may detect characteristics of the one or more proximate vehicles, such as location and speed of the proximate vehicles, as well as relative characteristics of the host vehicle and the proximate vehicle, such as relative distance and speed between the host vehicle and the one or more proximate vehicles.

Accordingly, the vehicle sensors 134 are operable to sense a measurement of data associated with the vehicle, the vehicle environment, the vehicle systems 122, the example host vehicle 300, and/or the proximate vehicles and generate a data signal indicating said measurement of data. These data signals can be converted into other data formats (e.g., numerical) and/or used by the vehicle systems 122 and/or the VCD 102 to generate other data metrics and parameters. It is understood that the sensors can be any type of sensor, for example, acoustic, electric, environmental, optical, imaging, light, pressure, force, thermal, temperature, proximity, among others.

The VCD 102 is also operatively connected for computer communication to the network 140 and a naturalistic behavior database 142. It is understood that the connection from the I/O interface 110 to the network 140, and the naturalistic behavior database 142 can be facilitated in various ways. For example, through a network connection (e.g., wired or wireless), a cellular data network from a portable device (not shown), a vehicle-to-vehicle ad-hoc network (not shown), an in-vehicle network (not shown), among others, or any combination of thereof. In some embodiments, the naturalistic behavior database 142 could be located on-board the vehicle, at for example, the memory 106 and/or the disk 108. In other embodiments, the naturalistic behavior database 142 can be distributed in one or more locations.

The network 140 is, for example, a data network, the Internet, a wide area network or a local area network. The network 140 serves as a communication medium to various remote devices (e.g., databases, web servers, remote servers, application servers, intermediary servers, client machines, other portable devices). In some embodiments, the naturalistic behavior database 142 may be included in the network 140, accessed by the VCD 102 through the network 140, and/or the network 140 can access the naturalistic behavior database 142. Thus, in some embodiments, the VCD 102 can obtain data from the naturalistic behavior database 142 via the network 140.

Application of Systems and Methods

The application of systems and methods are described with respect to a host vehicle. A host vehicle is a vehicle having the operating environment 100 described above. The host vehicle may be a vehicle in the merge lane 202 or the mainline lane 204. Examples will be described in which either a merging vehicle 208 or a mainline vehicle 210 is a host vehicle or both the merging vehicle 208 and the mainline vehicle 210 are host vehicles. The examples are exemplary in nature and are not provided to be limiting. For example, an embodiment in which the merging vehicle 208 is a host vehicle does not imply that the mainline vehicle 210 is not a host vehicle. The mainline vehicle 210 may or may not be a host vehicle. Thus, a host vehicle is the merging vehicle 208 and/or a mainline vehicle 210. Accordingly, the disclosed features and functions, or alternatives or varieties thereof, of the host vehicle may be implemented by either a merging vehicle or a mainline vehicle.

Figure 2:
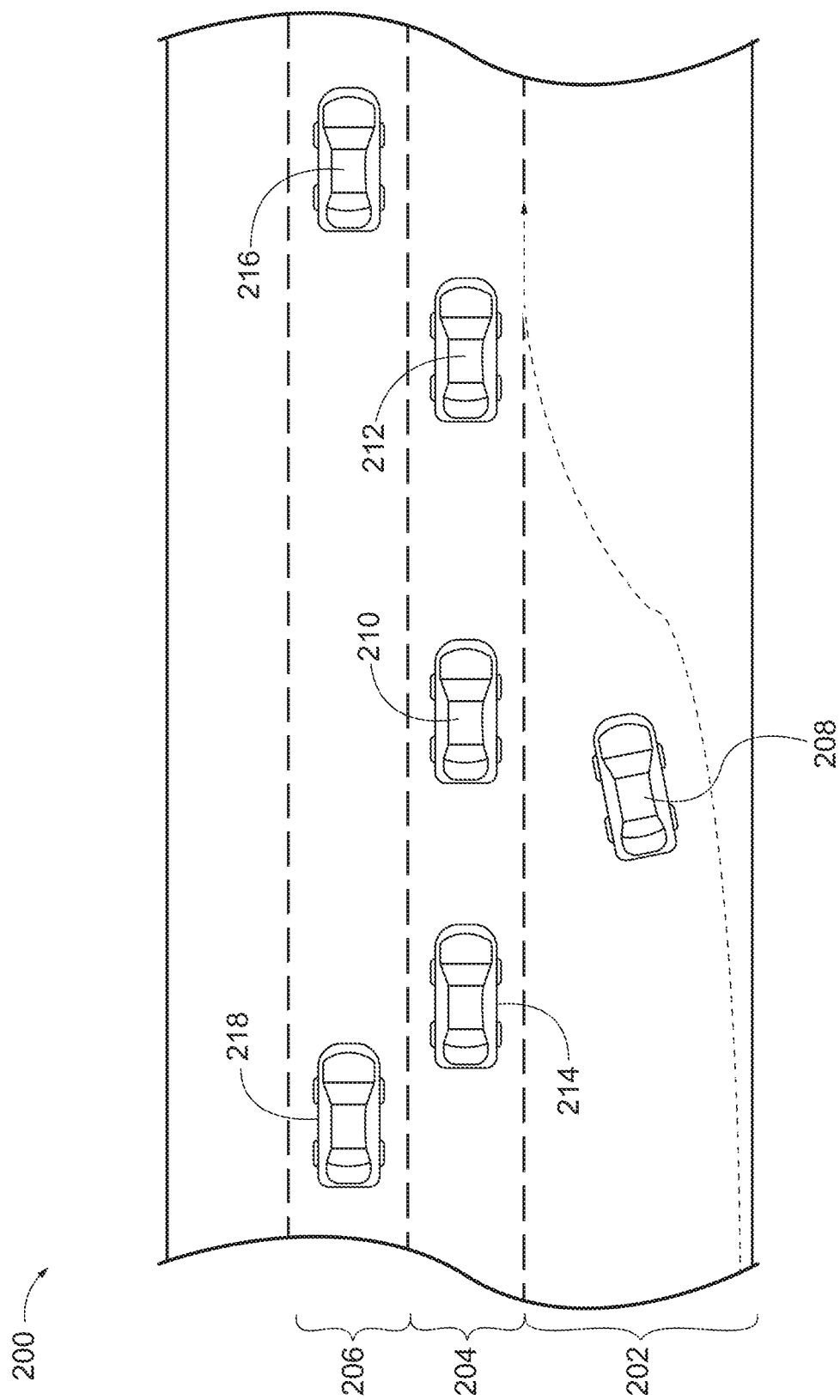
FIG. 2 is a schematic diagram of a host vehicle merging into a mainline lane with respect to a first vehicle and a second vehicle according to an exemplary embodiment.

FIG. 1 is a schematic diagram of an operating environment 100 for implementing systems and methods for predicting merge behavior from merging vehicles on a roadway. In roadway example 200, shown in FIG. 2, the roadway has a merge lane 202, a mainline lane 204, and an adjacent mainline lane 206. The merging vehicle 208 and/or the mainline vehicle 210 can be a host vehicle that employs the operating environment 100 to assist the host vehicle in predicting the behavior of at least one proximate vehicle traveling near the host vehicle. For example, in a first embodiment, the host vehicle may be the merging vehicle 208 that is attempting to merge from the merging lane 202 into the mainline lane 204. In a second embodiment, the host vehicle may be the mainline vehicle 210 that is already traveling in the mainline lane 204 that the merging vehicle 208 is attempting to merge into. Alternatively, both the merging vehicle 208 and the mainline vehicle 210 may be host vehicles having the operating environment 100.

As described above, the operating environment 100 includes the processor 104 having the identification module 114. The identification module 114 identifies at least one proximate vehicle in a lane having traffic moving in the same direction as the host vehicle. Returning to the first embodiment in which the merging vehicle 208 is the host vehicle, the identification module 114 identifies the mainline vehicle 210 as a proximate vehicle. The identification module 114 may additionally identify a first proximate vehicle 212 and/or a second proximate vehicle 214 also traveling in the mainline lane 204 as proximate vehicles. In embodiments in which there is more than one lane having traffic travelling in the same direction as the host vehicle, the identification module 114 may identify proximate vehicles from more than one lane. For example, the identification module 114 may additionally identify a third proximate vehicle 216 and/or a fourth proximate vehicle 218 traveling in the adjacent mainline lane 206 as proximate vehicles.

In the second embodiment, in which the mainline vehicle 210 is the host vehicle, the identification module 114 identifies the merging vehicle 208 as a proximate vehicle. The identification module 114 may also identify the first proximate vehicle 212 and the second proximate vehicle 214 also traveling in the mainline lane 204, as well as the third proximate vehicle 216 and the fourth proximate vehicle 218 the adjacent mainline lane 206 as proximate vehicles.

The identification module 114 may identify at least one proximate vehicle using data received from the vehicle systems 122 and/or the proximate vehicle sensors 138 of the vehicle sensors 134. The proximate vehicle sensors 138 may include one or more optical sensors (e.g., radio detection and ranging (RADAR) device, light imaging detection and ranging (LiDAR) device, etc.) and/or image sensors (e.g., camera, magnetic resonance imager, x-ray imager, etc.).

Figure 3:
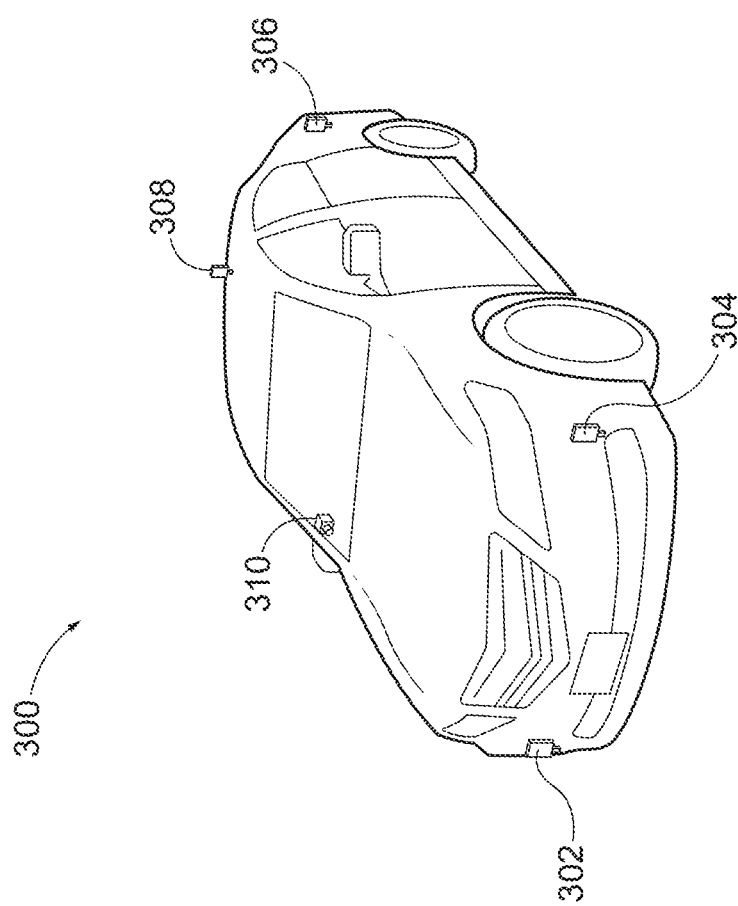
FIG. 3 is a schematic illustration of a host vehicle having example proximate vehicle sensors according to an exemplary embodiment.

An example host vehicle 300 having optical sensors and image sensors is shown in FIG. 3. The example host vehicle 300 has a number of proximate vehicle sensors 138, such as RADAR devices including a first front-range RADAR 302 and a second front-range RADAR 304. The example host vehicle 300 may also have mid-range RADAR, such as a mid-range RADAR 306 and at least one rear-range RADAR, such as a rear-range RADAR 308. While the first front-range RADAR 302, the second front-range RADAR 304, the mid-range RADAR 306, and the rear-range RADAR 308 are described as RADAR devices any other kind of sensors for identifying at least one proximate vehicle may be used, such as LiDAR. It is understood that the proximate vehicle sensors 138 can be disposed on any location of the interior or exterior of the example host vehicle 300. For example, sensors can be disposed in the doors, bumpers, wheel wells body, rearview mirror, side view mirror, dashboard, rear window, etc.

The example host vehicle 300 may also include at least one image sensor, such as camera 310. The camera 310 may be mounted to the interior or exterior of the example host vehicle 300. The camera 310 may detect visible and infrared light from the proximate vehicles. The camera 310 may also detect a pattern of light in images processed by the identification module 114 or a vehicle system 122. The pattern of light may indicate that at least one proximate vehicle has illuminated a turn signal or that the end of lane as the markings on the pavement stop.

The first front-range RADAR 302, the second front-range RADAR 304, the mid-range RADAR 306, the rear-range RADAR 308, and the camera 310 are exemplary in nature and more or fewer sensors may be used. Also, the first front-range RADAR 302, the second front-range RADAR 304, the mid-range RADAR 306, the rear-range RADAR 308, and the camera 310 may be different sensors than those described.

Returning to FIG. 1, in some embodiments, the identification module 114 may identify proximate vehicles in real-time and/or store, aggregate, and track data regarding previously identified proximate vehicles. In another embodiment, the identification module 114 may receive information about proximate vehicles from remote sensors (accessed, for example, via the network 140), for example, external cameras, radar and laser sensors on other vehicles, such as the proximate vehicles, in a vehicle-to-vehicle network, street cameras, surveillance cameras, in-pavement sensors, among others.

The identification module 114 may additionally identify one or more merging characteristics that indicate that a proximate vehicle may be about to attempt a merge. The merging characteristics may include turn signal illumination on a proximate vehicle, proximity of the proximate vehicle to the host vehicle or pavement lines, an end of the merge lane 202, an obstacle in the merge lane 202, traffic congestion, etc. For example, the host vehicle may detect a turn signal being illuminated on a proximate vehicle. In another example, returning to the second embodiment in which the mainline vehicle 210 is the host vehicle, the identification module 114 may identify the merging vehicle 208 as attempting to merge into the mainline lane 204 based on one or more merging characteristics.

In one embodiment, the identification module 114 may flag an identified proximate vehicle attempting to merge based on one or more of the merging characteristics. Suppose that the identification module 114 identifies a number of proximate vehicles. The identification module 114 may flag at least one of the proximate vehicles as about to merge based a threshold number of merging characteristics being identified.

In another embodiment, the merging characteristics may be tiered. For example, the turn signal illumination may be a first tier merging characteristic on a proximate vehicle while the proximity of the proximate vehicle to the host vehicle or pavement lines, the end of the merge lane 202, and an obstacle (not shown) in the merge lane 202 may be second tier merging characteristics. The identification module 114 may flag a proximate vehicle as about to merge when a single first tier merging characteristic is identified but may only flag a proximate vehicle if two or more second tier merging characteristics are identified. While two tiers are described, more or fewer tiers may be employed.

The prediction module 116 of the processor 104 selects one or more vehicle models based on the identified at least one proximate vehicle. The one or more vehicle models may be selected based on the relative location of the at least one proximate vehicle to the host vehicle. For example, the prediction module 116 may select a vehicle model for each identified proximate vehicle. In another embodiment, even if a plurality of proximate vehicles is identified, the prediction module 116 may select a single vehicle model for a single proximate vehicle. The single proximate vehicle may be assigned a vehicle model because the single proximate vehicle was flagged as about to merge or based on the proximity of the single proximate vehicle to the host vehicle relative to the other proximate vehicles. For example, the single proximate vehicle may be closer to the host vehicle than the other proximate vehicles.

The prediction module 116 then uses the selected one or more vehicle models to calculate one or more merge factors corresponding to the selected one or more vehicle models. The prediction module 116 predicts a merge location based on the one or more merge factors.

The one or more vehicle models may be based on the following prediction model equation:

$$P(\text{merge ahead}) = P(y=1) = \pi\left(\beta_0 + \sum_{i=1}^{p} \beta_i x_i\right)$$

where $\pi(q) \triangleq \dfrac{e^q}{1+e^q}$, $x_i$ = candidate factor$_i$, $\beta_i$ = model coefficients The candidate factors and model coefficients are model parameters that are selected based on the one or more vehicle models. For example, in a scenario where the proximate vehicle precedes the host vehicle, the prediction module 116 selects a preceding vehicle model. In a scenario where the proximate vehicle follows the host vehicle, the prediction module 116 selects a following vehicle model. Based on the selected vehicle model, different model parameters may be used. The candidate factors are characteristics of the host vehicle and proximate vehicle, such as relative distance to one another or their relative speed. The model coefficients are estimated from naturalistic data. The naturalistic data may be received from the naturalistic behavior database 142 via network 140.

The naturalistic data may include data from the host vehicle such as the monitored behavior of the driver of the host vehicle, monitored behavior of vehicles on a specific roadway, or monitored behavior of a number of vehicles on one or more roadways may be aggregated as global data. For example, the on-ramps of major highways may be monitored to determine naturalistic behavior. The monitored behavior may be received by the naturalistic behavior database 142 via network 140 from roadway sensors such as traffic cameras, captured video of roadways, in-pavement sensors, vehicle sensors from other vehicles on the roadway, amongst others.

In some embodiments, naturalistic behavior may be categorized by different features of the roadway, such as the number of lanes traveling in the same direction (e.g., 2, lanes 4 lanes, 5 lanes, 6 lanes), length of the merge lane 202 (e.g., short on-ramp, long on-ramp), immediacy of the merge (e.g., urgent merge or relaxed merge), distance from merging vehicle to the end of the merge lane, amount of traffic congestion, amongst others. The naturalistic data may be in the form of the Federal Highway Administration Next Generation Simulation (NGSIM) datasets. The selected vehicle model uses the model coefficients to incorporate naturalistic data to mathematically represent an observable merging pattern.

Example candidate factors, $x_i$, are defined at time $t_{begin}$, and $\beta_i$ are model coefficients with unknown values to be estimated, and p is the number of features in the model. Specific values ($b_i$) for the model coefficients may be estimated using a maximum likelihood logistic regression analysis method. This maximum likelihood method minimizes the deviance defined as:

$$D = -2\Sigma_{k=1}^{n}(y_k \ln \hat{y}_k + (1-y_k)\ln(1-\hat{y}_k))$$

where $\hat{P}_{before} = \hat{y} = \pi(b_0 + \Sigma_{i=1}^{p} b_i x_i)$ and where n is the number of observed merge events used in the analysis.

Example candidate factors, $x_i$, and model coefficients, $b_i$, for the preceding vehicle model are based on the relative motion of the host and proximate vehicles as well as the received naturalistic data, and may be as follows:

| Preceding Vehicle Model | | | |
|---|---|---|---|
| $b_0$ | 2.7 | | |
| $b_1$ | −0.0558 | $x_1$ | $\Delta d_{th}$ |
| $b_2$ | 0.000126 | $x_2$ | $(\Delta d_{th})^2$ |
| $b_3$ | 0.133 | $x_3$ | v |
| $b_4$ | −0.104 | $x_4$ | $\Delta v_p$ |
| $b_5$ | −4.26 | $x_5$ | F |
| $b_6$ | −0.127 | $x_6$ | $v_{avg}$ |

Thus, the candidate factors include the relative preceding distance, $\Delta d_{th}$, measured in ft between the tail of the preceding vehicle to the head of the host vehicle, as well as, the host vehicle velocity, v, and relative preceding velocity, $\Delta v_p$, the velocity of the preceding vehicle relative to the host vehicle. All velocities may be measured in ft/s. The candidate factors also include a following vehicle variable, F, that is a binary value that indicates the existence of a following vehicle, for example, as either (1) a following vehicle exists or (0) a following vehicle does not exist. The candidate factors also include an average mainline velocity, $v_{avg}$, the average speed of vehicles traveling in the mainline lane. The candidate factors may also be measures in other units or unit systems, such as miles per hour or metric, with corresponding changes to the model coefficients $b_i$.

The candidate factors may additionally include variables that account for the different ways in which larger vehicle behave. A preceding transport vehicle variable, T, may be a binary value that indicates the existence of a preceding transport vehicle, for example, as either (1) the vehicle preceding the host vehicle is a preceding transport vehicle or (0) the vehicle preceding the host vehicle is not preceding transport vehicle. Likewise, an impeding vehicle variable, I, allows for potential differences in the merging behavior due to the presence of a vehicle in front of the host vehicle. For example, the impeding vehicle variable, I may be either (1) the vehicle preceding the host vehicle is likely to impede the host vehicle or (0) the vehicle preceding the host vehicle is not likely to impede the host vehicle. In this manner, the preceding transport vehicle variable, T, and the impeding vehicle variable, I, like the following vehicle variable, F, are categorical variables.

The candidate factors may be determined by the prediction module 116 based on data received from the host vehicle sensors 136 and the proximate vehicle sensors 138. For example, the host vehicle sensors 136 may detect velocity of the host vehicle. Likewise, the proximate vehicle sensors 138 may detect data from the proximate vehicle, and from the proximate vehicle relative to the host vehicle, such as and relative following velocity, $\Delta v_f$, the velocity of the following vehicle relative to the host vehicle. In one embodiment, the rear-range RADAR 308 and/or the camera 310 of the proximate vehicle sensors 138 detect a following vehicle. Accordingly, the prediction module 116 uses the data from the rear-range RADAR 308 and/or the camera 310 to determine the binary value of the following vehicle variable, F.

In some embodiments, a merge factor may be calculated as a probability (e.g., a value between 0 and 1) that indicates the likelihood that a human driver would merge at a potential merge location. For example, in the preceding vehicle model, the one or more merge factors indicate the probability that a human driver would merge ahead of a preceding vehicle or anywhere behind it. Suppose that the probability is represented by a value between 0 and 1. In some embodiments, the higher the merge factor, the more likely that a human driver would merge ahead of the preceding vehicle. Thus, the merge location may be predicted based on the value of the one or more merge factors.

Should the host vehicle attempt to merge at the predicted merge location, mimicking human behavior, the merge maneuver would likely cause the preceding vehicle to yield as the merge would be a maneuver that a driver of the preceding vehicle would expect. In this manner, even if the host vehicle is a merging vehicle, the host vehicle can use a vehicle model to predict a merge that may initiate a merge maneuver, such as a courtesy merge maneuver (e.g. slow down to increase gap length) from a mainline vehicle.

In one example, the vehicle model, such as the resulting preceding vehicle model may be:

$$P(\text{merge before the preceding vehicle}) = \frac{e^{2.7-0.0558(\Delta d_{th})+0.000126(\Delta d_{th})^2+0.133v-0.104\Delta v_p-4.26F-0.127v_{avg}}}{1+e^{2.7-0.0558(\Delta d_{th})+0.000126(\Delta d_{th})^2+0.133v-0.104\Delta v_p-4.26F-0.127v_{avg}}}$$

Figure 4:
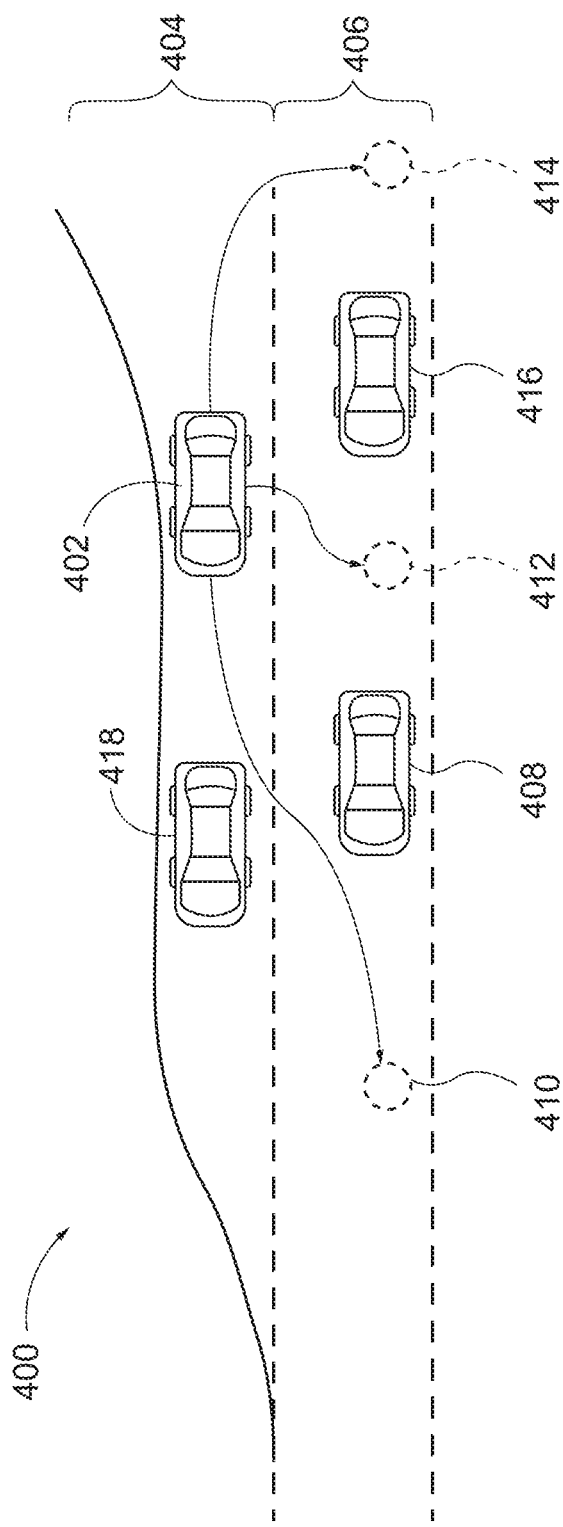
FIG. 4 is a schematic diagram of a merging vehicle merging into a mainline lane with respect to a preceding vehicle model and/or following vehicle model according to an exemplary embodiment.

A preceding vehicle model is described with respect to FIG. 4, which illustrates a schematic diagram 400 having a merging vehicle 402 merging from a merge lane 404 into a mainline lane 406 with respect to a mainline vehicle 408 according to an exemplary embodiment. Suppose the merging vehicle 402 is the host vehicle. The mainline vehicle 408 precedes the merging vehicle 402, hence the preceding vehicle model being selected. The preceding vehicle model is used to calculate one more merge factors in order to estimate the probability that a merging driver would merge before or after the preceding vehicle.

The prediction module 116 identifies at least one potential merge location where the merging vehicle 402 may attempt to merge according to the one or more merge factors. The potential merge locations may fall ahead of or behind proximate vehicles, such as a first potential merge location 410 and a second potential merge location 412. While the potential merge locations are shown as circles having an area for clarity, it is understood that the potential merge locations may not correspond to an area or volume of space in which the merge is predicted to happen. Instead, the potential merge locations may correspond to points of space preceding or following a proximate vehicle that indicate whether a merging vehicle 402 will merge ahead of or behind the proximate vehicle.

The value of the one or more merge factors may correspond to one of the potential merge locations. In one embodiment, each of the potential merge locations may correspond to a range of values. In one embodiment, the range of values is dependent on a merge threshold value. For example, the prediction module 116 predicts a merge location from the potential merge locations based on which of the ranges corresponds to the value of the one or more merge factors. Suppose the first potential merge location 410 corresponds to a merge threshold value of greater than or equal to 0.5 and the second potential merge location 412 corresponds to the merge threshold value being less than 0.5. The merge factors may correspond to probabilities, thus a merge factor in a range of values between 0.5-1 would correspond to the first potential merge location and a merge factor in the range of values between 0-0.49 correspond to the second potential merge location 412. Accordingly, if a merge factor is calculated to be 0.6, the prediction module 116 predicts the first potential merge location 410 as the predicted merge location that is the most likely based on naturalistic human behavior.

The merge threshold value may be selected to cause the prediction module 116 to select potential merge locations according to emulation parameters. The emulation parameters may include prediction accuracy and/or driver behavior. For example, the merge threshold value may be selected to reduce the number of false positives predicted by the prediction module 116. Driver behavior can also be imitated by adjusting the merge threshold value. In one embodiment, the merge threshold value may be lowered to cause the prediction module 116 to predict a more aggressive merges. For example, a lower merge threshold value would cause the prediction module 116 to select the first potential merge location 410 more often such that the merging vehicle 402 is predicated to merge ahead of the mainline vehicle 408 more often. Alternatively, the merge threshold value may be raised to cause the prediction module 116 to predict a more cautious merges, such that the prediction module 116 would select the second potential merge location 412 more often such that the merging vehicle 402 is predicated to merge behind the mainline vehicle 408 more often.

Each potential merge location is described as having a distinct range for ease of explanation, however the potential merge locations may have overlapping ranges. In the event that the ranges overlap, the prediction module 116 may recalculate the one more merge factors based on potential merge locations that met the previous one or more merge factors. In this manner, the recalculated merge factor may be refined for the overlapping potential merge locations until the one or merge factors corresponds to a single potential merge location. Additionally, a vehicle occupant may be prompted to select a merge location when two or more potential merge locations are predicted by the prediction module 116 based on the one or more merge factors. For example, the vehicle occupant may be prompted with an audio cue from the audio system 128 or a visual cue on the display 132.

As discussed above, the one or more merge factors may be calculated as a probabilities (e.g., a value between 0 and 1) that indicate the likelihood that a human driver would merge at a potential merge location. Therefore, in some embodiments, the merge prediction module 116 may select the potential merge location corresponding to the merge factor of the one or more merge factors having the highest value, and accordingly the highest probability that a human would select that potential merge location.

In another embodiment, the prediction module 116 may also take into account driving parameters to select one of multiple potential merge locations once the one or more merge factors have been calculated. The driving parameters may include a steering angle, a braking force, host vehicle velocity, proximate vehicle velocity, following distance of the host vehicle, or a change in steering angle over time during a driving maneuver, etc. Accordingly, the prediction module 116 may predict a merge location based on historical vehicle occupant behavior data.

The prediction module 116 may also take into account behavior of the proximate vehicles that are not subject to a vehicle model. Suppose a following vehicle 416 is approaching the mainline vehicle 408 and/or the merging vehicle 402 is approaching a preceding vehicle 418. The prediction module 116 may select the first potential merge location 410 or second potential merge location 412 based on driving parameters such as the velocity of the mainline vehicle 408 relative to the following vehicle 416 or the proximate vehicle velocity at which the merging vehicle 402 is approaching a preceding vehicle 418. For example, if the following vehicle 416 is approaching the mainline vehicle 408 quickly, thereby closing the second potential merge location 412, the prediction module 116 may predict the first potential merge location 410 is the merge location most likely to be selected by a vehicle occupant based on naturalistic human behavior.

As described, the prediction module 116 of merging vehicle 402 may predict merge behavior based on the position of the mainline vehicle 408 relative to the merging vehicle 402 using the preceding vehicle model. Additionally or alternatively, the prediction module 116 of the merging vehicle 402 may predict merge behavior according to another proximate vehicle, such as the following vehicle 416 using the following model. Based on the following model, the prediction module 116 may predict a merge location from the second potential merge location 412 or a third potential merge location 414.

The following vehicle model may use the same or different candidate factors, $x_n$, and model coefficients, $\beta_n$. Example candidate factors, $x_n$, and model coefficients, $\beta_n$, for the following vehicle model are based on the relative motion of the host and proximate vehicles as well as the received naturalistic data and may be as follows:

| Following Vehicle Model | | | |
|---|---|---|---|
| $\beta_0$ | | 0.35 | |
| $\beta_1$ | −0.628 | $x_1$ | $\Delta d_{hh}$ |
| $\beta_2$ | −0.156 | $x_2$ | $\Delta v_f$ |

Thus, the candidate factors include the relative following distance, $\Delta d_{hh}$, measured between the head of the following vehicle to the head of the host vehicle, as well as, and relative following velocity, $\Delta v_f$, the velocity of the following vehicle relative to the host vehicle. The candidate factors may be determined from data from the host vehicle sensors 136. For example, the host vehicle sensors 136 may detect velocity of the host vehicle. Likewise, the proximate vehicle sensors 138 may detect data from the proximate vehicle, and from the proximate vehicle relative to the host vehicle, such as relative following velocity, $\Delta v_f$, the velocity of the following proximate vehicle relative to the host vehicle.

The resulting following vehicle model may be:

$$P(\text{merge before the following vehicle}) = \frac{e^{0.35-0.628(\Delta d_{hh})-0.156\Delta v_f}}{1+e^{0.35-0.628(\Delta d_{hh})-0.156\Delta v_f}}$$

Based on the one or more merge factors calculated according to the following model, the prediction module 116 can predict a merge location from between the proximate vehicles, such as the second potential merge location 412 and the third potential merge location 414, in a similar manner as described above. For example, the value of the one or more merge factors may correspond to one of the potential merge locations. Thus, the prediction module 116 may predict a potential merge location from the potential merge locations based on which of ranges of values corresponds to the one or more merge factors in a similar manner as described above with respect to the preceding vehicle model. The ranges may be based on the same or a different merge threshold value as described above with respect to the preceding vehicle model. The predicted merge location is selected as the most likely location that a vehicle occupant would choose to merge based on naturalistic human behavior data.

As an alternative to using ranges, the one or more merge factors may be compared to a threshold value to determine which potential merge location is the most likely based on naturalistic human behavior. For example, a merge factor being greater than the threshold value may indicate that the human driver would be predicted to merge ahead of the following vehicle 416 at the second potential merge location 412. If instead the merge factor is less than the threshold value, a human driver would be predicted to merge behind the following vehicle 416 at the third potential merge location 414.

While the preceding model and the following model have been described separately for clarity, the preceding model and the following model may be combined to form a behavior model that can model the behavior for multiple proximate vehicles such as the mainline vehicle 408 and the following vehicle 416. Because the prediction is based on more than one proximate vehicle, the prediction module can select from more than two potential merge locations. For example, because the mainline vehicle 408 and the following vehicle 416 are modeled here, a potential merge location can be selected from the first potential merge location 410, the second potential merge location 412, or the third potential merge location 414 according to the behavior model. As described above, the preceding vehicle model or the following vehicle model is selected based on the relative positions of the host vehicle and the proximate vehicle being modeled. Accordingly, the preceding vehicle model or the following vehicle model may be selected by a host vehicle based on the relative position of any one of the proximate vehicles to the host vehicle.

The behavior model may be generated from the following vehicle model and the preceding vehicle model using a machine learning method. Any type of machine learning model can be implemented, such as a random forest model, a support vector machine, or a logistical regression model.

For example, suppose the mainline vehicle 408 is approaching a mainline vehicle 408 and/or the merging vehicle 402 is approaching a merging preceding vehicle 418. The prediction module 116 may predict the first potential merge location 410 or the second potential merge location 412 based on the driving parameters such as the vehicle velocity of the following vehicle 416 relative to the mainline vehicle 408 or the vehicle velocity at which the merging vehicle 402 is approaching the merging preceding vehicle 438. For example, if the merging preceding vehicle 438 is traveling head to head with the mainline vehicle 408 at a similar velocity, the first potential merge location 430 may not be available to the merging vehicle, and accordingly, the prediction module 116 may predict the second potential merge location 412.

While the example in FIG. 4 describes a following vehicle model with respect to the merging vehicle 402 as the host, the following vehicle 416 could also be a host vehicle. For example, rather than a following vehicle model, a preceding vehicle model may be used by the following vehicle 416 acting as the host vehicle because the merging vehicle 402 precedes the following vehicle 416.

In the embodiments described thus far, one of the proximate vehicles is applied to a vehicle model. However, multiple proximate vehicles may be applied to vehicle models resulting in a plurality of merge factors being calculated. For example, suppose the merging vehicle 402 is a host vehicle, the prediction module 116 may select a following vehicle model with respect to the following vehicle 416 and a preceding vehicle model the mainline vehicle 408. In this manner, the prediction module 116 may use both the preceding vehicle model and the following vehicle model. In another embodiment, the prediction module 116 may use the preceding vehicle model with respect to both the mainline vehicle 408 and the preceding vehicle 418.

Returning to the example in which the following vehicle 416 of FIG. 4 is the host vehicle, the prediction module 116 may select a preceding vehicle model based on the relative position of the merging vehicle 402 to the following vehicle 416. The one or more merge factors are calculated based on the selected model, and prediction module 116 predicts a merge location based on the one or more merge factors.

The control module 118 adjusts a kinematic parameter of the following vehicle 416 based on the predicted merge location. For example, the control module 118 may adjust a kinematic parameter of the following vehicle 416 to create or enlarge a gap at the predicted merge location. Accordingly, the control module 118 may control the following vehicle 416 to create a gap at the predicted second potential merge location 412 of a sufficient size to allow the merging vehicle 402 to move from the merging lane 404 into the mainline lane 406. Thus, the control module 118 can cause the following vehicle 416 to facilitate a courtesy merge for the merging vehicle 402 in a similar manner as a human driver might.

The kinematic parameters may include a current speed, current velocity, a compass heading of the host vehicle, etc. that change the motion of the host vehicle. In some embodiment, the control module 118 may employ an application program interface (API) component (not shown). The API component may operate the host vehicle based on information from the control module 118. In this manner, the control module 118 and/or the API component may operate the host vehicle in an autonomous fashion.

For example, suppose the host vehicle is a merging vehicle currently in a merge lane, the control module 118 may control a longitudinal speed control function would be evaluated at a higher rate, such as 10 Hz, since it uses information that may vary quickly. The longitudinal speed control function is used by the control module 118 to line up the host vehicle with the predicted merge location. In this manner, the control module may implement the following acceleration command:

$$a=\lim(-0.5\ g, K_y y_e + K_u u_e, 0.5\ g)$$

where $K_y = 1/\text{sec}^2$ and $K_y = 2/\text{sec}^2$

The $y_e$ and $u_e$ terms are the relative gap and velocity errors based on the at least one proximate vehicle identified by the identification module 114. In some embodiments, a check gap function would also be evaluated at 10 Hz. In this example, if the following conditions are met: the host vehicle is in the merging lane that is not an on-ramp, the front and rear gaps are both greater than a predetermined gap length (e.g., 1.52 m (5 ft)), and the front and rear times-to-1.52 m gap are both greater than 5 seconds, then a merge maneuver would be initiated.

In this manner, the vehicle models are used to predict merge behavior. One or more merge factors are calculated from the vehicle models. The one or more merge factors may indicate 1) unrestricted merge, where there are no preceding nor following vehicles; 2) merge ahead of the following vehicle, where there is no preceding vehicle; 3) merge ahead of the preceding vehicle; 4) merge in-between the preceding and following vehicles; 5) merge behind the following vehicle; 6) merge behind the preceding vehicle, where there is no following vehicle. For example, in one embodiment, the merge factors relative to the proximate vehicles that may be on the roadway may be indicative of:

| Merge Type Indicated by the Merge Factor | Predicted Potential Merge Location | Vehicle Ahead | Vehicle Behind |
| --- | --- | --- | --- |
| Unrestricted merge - where there are no preceding nor following vehicles | 412 | none | none |
| Merge ahead of the following vehicle - where there is no preceding vehicle | 412 | none | 416 |

| Merge Type Indicated by the Merge Factor | Predicted Potential Merge Location | Vehicle Ahead | Vehicle Behind |
|---|---|---|---|
| Merge ahead of the preceding vehicle | 410 | (a) | 408 |
| Merge in-between the preceding and following vehicles | 412 | 408 | 416 |
| Merge behind the following vehicle | 414 | 416 | (b) |
| Merge behind the preceding vehicle - where there is no following vehicle | 412 | 408 | none |

The table illustrates the merge type based on the vehicles in the roadway example. In the "Merge ahead of the preceding vehicle" row, "(a)" is indicative of there possibly being another vehicle in front of the preceding vehicle. If so, the relative distance and velocity of the vehicle in front of the preceding vehicle is used to determine the acceptable gap and speed regulation of the host vehicle. In the "Merge behind of the following vehicle" row, "(b)" is indicative of there possibly being another vehicle in behind of the following vehicle. If so, the relative distance and velocity of the vehicle behind the following vehicle is used to determine the acceptable gap and speed regulation of the host vehicle.

Figure 5:
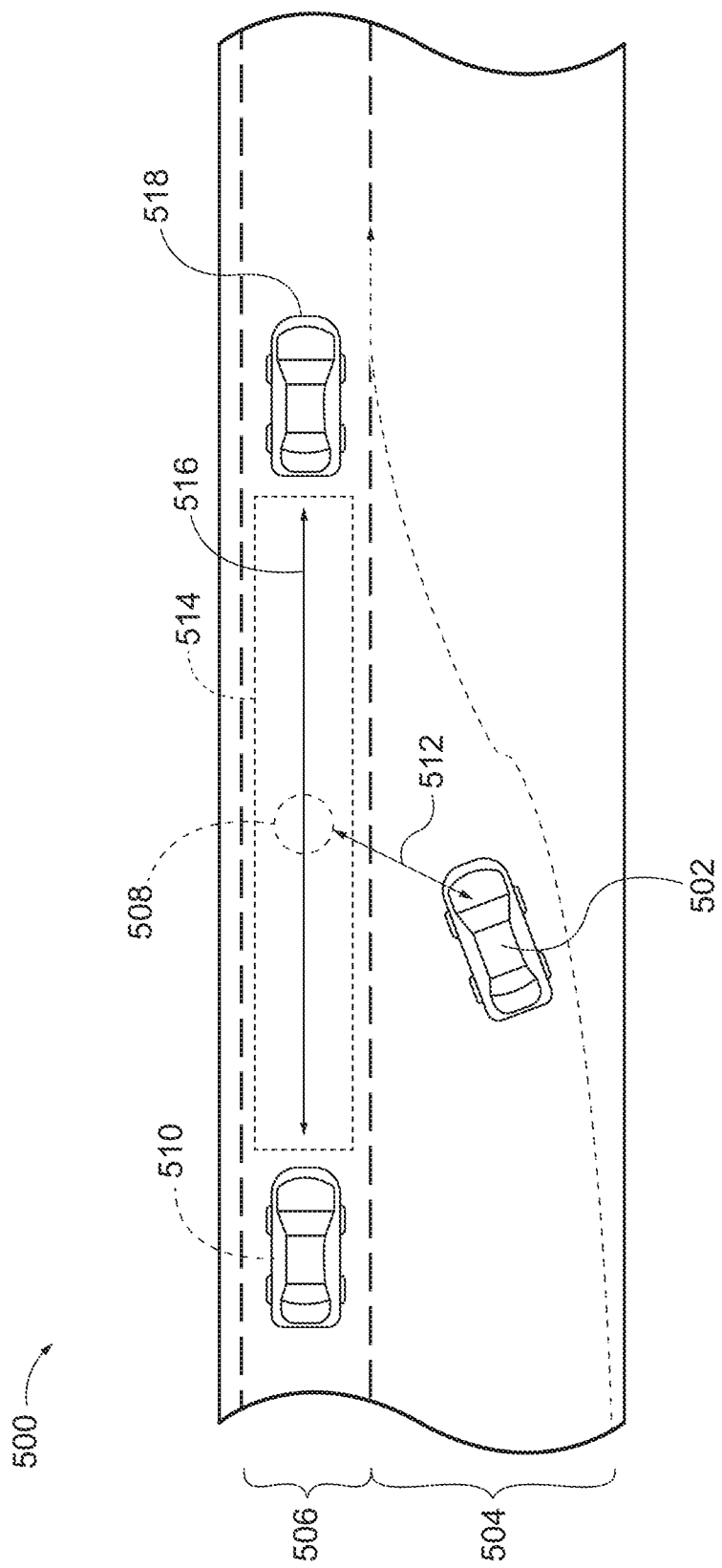
FIG. 5 is a schematic diagram of a merging vehicle moving within a merging distance of a predicted merge location according to an exemplary embodiment.

FIG. 5 is a schematic diagram depicting a merging vehicle moving within a merging distance of a predicted merge location according to an exemplary embodiment. The control module 118 adjusts a kinematic parameter of the merging vehicle 502 in a merge lane 504, adjacent a mainline lane 506. A predicted merge location 508 is ahead of a mainline vehicle 510 in the mainline lane 506. The kinematic parameter of the merging vehicle 502, here a host vehicle, is adjusted to bring the merging vehicle 502 within a merging distance 512 of the predicted merge location 508. The merging distance 512 may be a threshold distance from the predicted merge location 508, for example, a predetermined number of yards, feet, or meters that longitudinally, laterally, or diagonally separate the merging vehicle 502 from the predicted merge location 508.

In one embodiment, when a merging vehicle 502 is within a merging distance 512 of the predicted merge location 508, then the mainline vehicle 510, if a host vehicle, is controlled by the control module 118 to initiate a courtesy merge by adjusting a kinematic parameter of the mainline vehicle 510 to create a gap 514 at the predicted merge location 508.

Alternatively, suppose the merging vehicle 502 is the host vehicle. In another embodiment, a merge module 120 of the merging vehicle 502, may determine whether a gap 514 at the predicted merge location 508 has sufficient size to accommodate the merging vehicle 502. The vehicle sensors 134 of the merging vehicle 502 may measure the gap length 516 of the gap 514. The gap length 516 may be defined by the distance from the mainline vehicle 510 to a preceding mainline vehicle 518. Where there is no preceding mainline vehicle 518, the gap length 516 may be deemed as open-ended and instead calculate the relative following distance, $\Delta d_{hh}$, measured between the head of the following vehicle to the head of the host vehicle, which is the merging vehicle 502 in this example.

In another embodiment, the gap length 516 may be compared to a gap threshold value to determine whether the gap 514 is of sufficient size to accommodate the merging vehicle 502. In some embodiments, the gap threshold is twice the length of the merging vehicle 502. In some embodiments, the gap length 516 being greater than the gap threshold value indicates that the gap 514 is of sufficient size to accommodate the merging vehicle 502. Conversely, the gap length 516 being less than the gap threshold value, indicates that the gap 514 is not of sufficient size to accommodate the merging vehicle 502.

In response to determining that the gap 514 is of sufficient size, the merge module 120 causes the merging vehicle 502 to initiate a merge maneuver. The merge maneuver may include the host vehicle moving into the predicted merge location or initiating a courtesy merge. For example, the longitudinal speed control may continue in order to stay in-between the desired target vehicles in the merge end lane, the host vehicle is steered according to a course angle, such as 20°, to merge into an end lane, and check for merge completion.

In some embodiments, initiating a merge maneuver may include alerting a vehicle occupant to the possibility of a merge. For example, the navigation may illustrate merge parameters, such as location, distance, and direction to the predicted merge location. The merge parameters may be displayed on the display 132 of the infotainment system 130 or a heads-up display (not shown).

Figure 6:
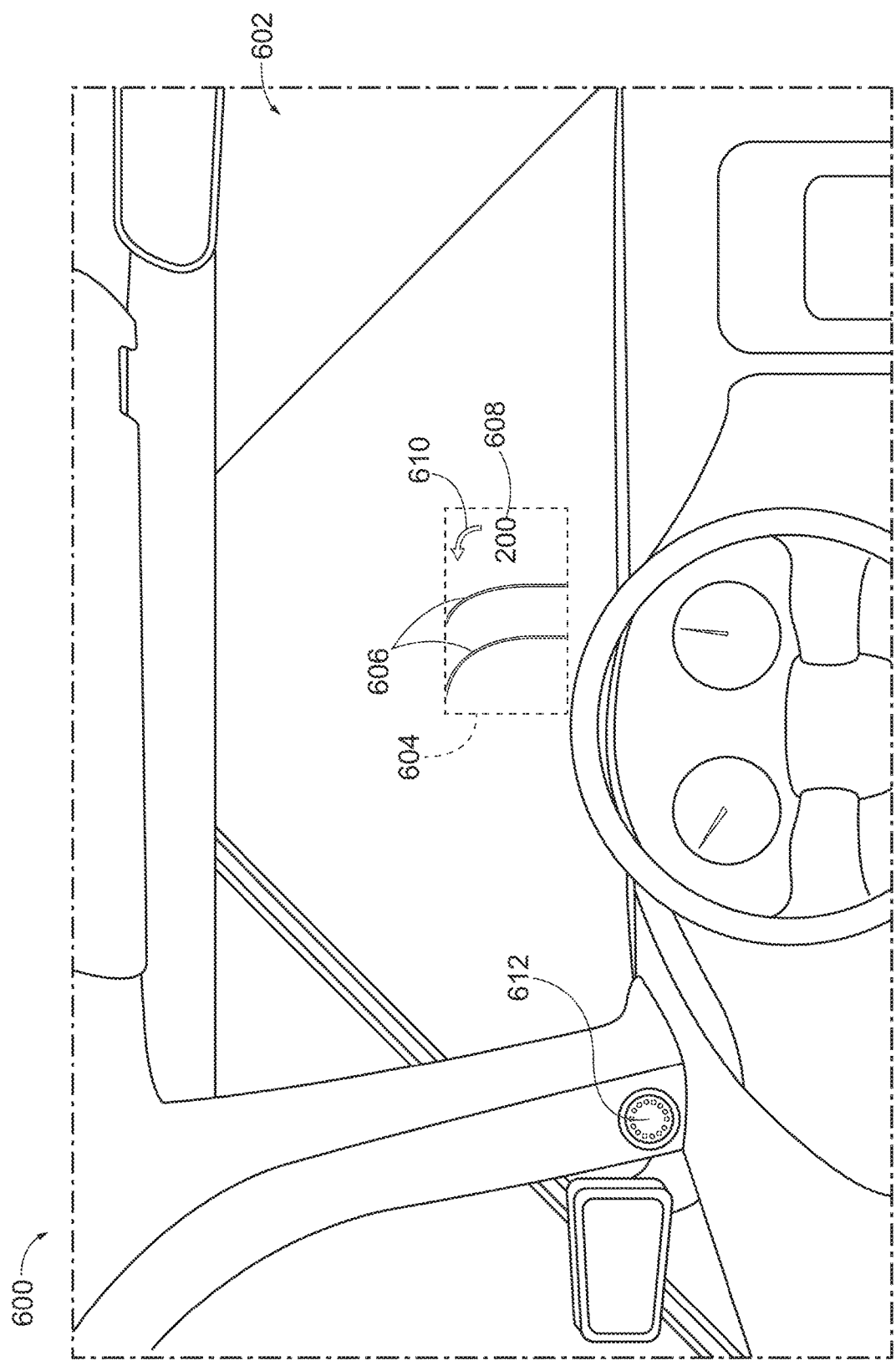
FIG. 6 illustrates a point of view of a merge image and merge alert light according to an exemplary embodiment.

FIG. 6 illustrates a point of view of a merge image and merge alert light according to an exemplary embodiment. FIG. 6 will be described with respect to FIG. 5. In particular, FIG. 6 illustrates a point of view of a driver looking through a windshield 602 of a vehicle 600 while merging alerts are displayed in a merge image 604. The merge image 604 may be projected by a heads-up display system (not shown). The merge image 604 includes the merge parameters. For example, the location 606, the distance 608, and the direction 610 to the predicted merge location 508 may be shown on the merge image 604. In some embodiments, the merge image 604 is overlaid with navigation information provided by the navigation system 124. In this manner, while providing direction to a destination, lane information specific to an identified lane on the roadway can be provided, such as a lane having a predicted merge location 508.

In addition to or as an alternative to displaying a merge image 604, the merge module 120 may use a light system 126 to control lights, for example, interior vehicle cabin lights, headlights, turn signals, blind spot indicators (not shown). In one embodiment, a merge light indicator 612 may incorporate one more lights, such as light emitting diodes, to indicate the existence and location of a predicted merge location 508. For example, suppose the merging vehicle 502 is a host vehicle. In response to determining that the gap 514 has sufficient size, the merge module 120 causes the merge light indicator 612 to illuminate in a predetermined color, flash a predetermined pattern, or both.

In addition to the merge module 120, the light system 126 may be controlled by the control module 118. For example, suppose the mainline vehicle 510 is a host vehicle. When adjusting a kinematic parameter, the control module 118 may also control the light system 126 to illuminate the merge light indicator 612 in colors and/or patterns to indicate the motion of the mainline vehicle 510 is changing in response to a merge location 508 being predicted.

In another embodiment, the processor 104 may cause the light system 126 to control the merge light indicator 612 to illuminate in a pattern and/or color to provide a visual cue to a vehicle occupant throughout the merge procedure. For example, suppose the merging vehicle 502 is a host vehicle, in response to a turn signal being illuminated, the merge light indicator 612 may illuminate in a red color until a predicted merge location 508 is predicted, a yellow color until the merging vehicle 502 is within a merge distance 512 of the predicted merge location 508, and/or a green color when the gap is of sufficient size for a merge or to indicate the merge maneuver has been initiated. Accordingly, the merge image 604 and/or merge light indicator 612 may be used to provide visual alerts to a vehicle occupant.

Additionally, the audio system 128 may provide a vehicle occupant with audio cues. For example, the audio system 128 can play an alert or adjust the content and/or volume of audio in an area around (e.g., proximate to the vehicle occupant or at a speaker proximate to the vehicle occupant) each vehicle occupant. For example, the merge light indicator 612 may include a speaker. The alert may be a sound, pattern of sounds, or vocal alert. The vocal alert may describe the merge parameters or to state instructions regarding a merge maneuver. In some embodiments, the navigation system 124, the light system 126, and audio system 128 may work in concert with the infotainment system 130 to provide visual and audio hybrid alerts to a vehicle occupant.

Returning to FIG. 5, the merge module 120 may control the merging vehicle 502 to operate or maneuver in way that facilitates the merging vehicle 502 merging into the gap 514 in the mainline lane 506. For example, the merge module 120 may trigger an autonomous driving system or an assisted driver-assistance system to cause the merging vehicle 502 to operate or maneuver accordingly. In response to determining that the gap 514 does not have a sufficient size, the merge module 120 causes the prediction module 116 to predict an updated merge location. Accordingly, the prediction module 116 will update the predicted merge location, when a previously predicted merge location becomes unfeasible. The updated predicted merge location is calculated in the same manner as described above incorporating the current relative position of the proximate vehicles, such as the mainline vehicle 510 or the preceding mainline vehicle 518.

In this manner, a predicted merge location 508 may be iteratively determined until the merging vehicle 502 chooses not merge or moves into the gap 514. The gap 514 may not be the optimal merge location, but because the models incorporate naturalistic datasets, the predicted merge location approximates human behavioral outcomes to provide smooth merge assistance. Thus, the merge behavior system implements a merging method and system with merge location prediction based on naturalistic datasets and improves a vehicle occupants experience through smarter and more human like behavior during merge maneuvers in high stress situations.

Figure 7:
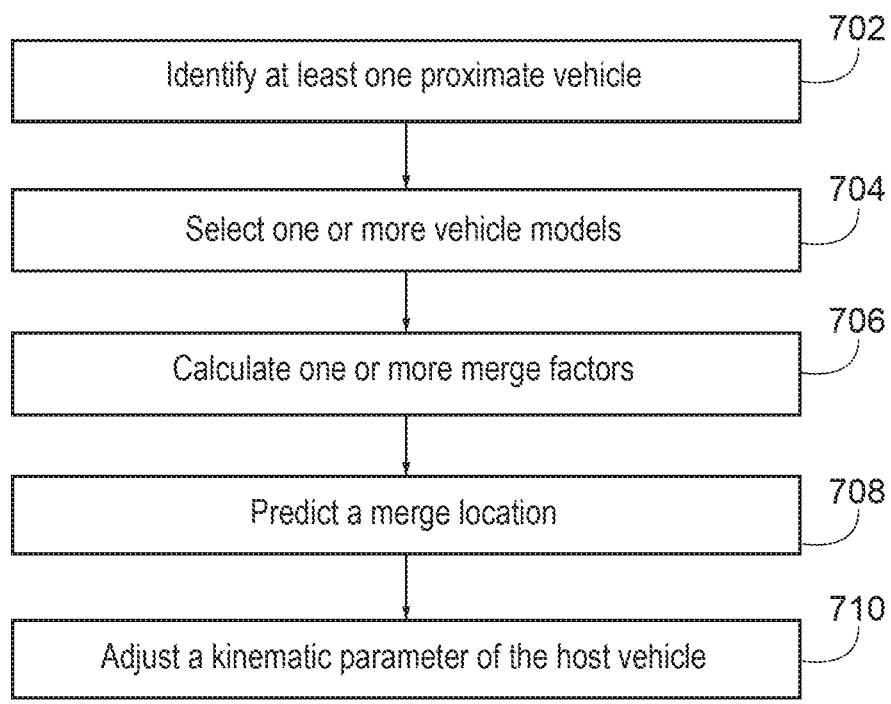
FIG. 7 is a process flow diagram of a method for predicting merge behavior according to an exemplary embodiment.

FIG. 7 is a process flow diagram of a method for predicting merge behavior. The merge behavior may be predicted from a merging vehicle as the host vehicle or a mainline vehicle as the host vehicle. It is understood that the illustrative examples discussed herein are exemplary in nature and that varying host vehicles, vehicle models, and kinematic parameters can be implemented.

At block 702, the method includes identifying at least one proximate vehicle in the merge lane and/or the mainline lane. In one embodiment, an identification module 114 receives data streams from proximate vehicle sensors 138 to determine if one or more proximate vehicles is proximate the host vehicle. Data streams may also be received by the identification module 114 from remote sensors (e.g., traffic cameras, in-pavement sensors, vehicle-to-vehicle network) over the network 140. In some embodiments, a vehicle within a proximate distance radius of the host vehicle is identified as a proximate vehicle. The proximate distance radius may be a predetermined radial distance measured from the host vehicle.

At block 704, the method includes selecting one or more vehicle models based on the at least one proximate vehicle. For example, a prediction module 116 may select a vehicle model based on a relative location of the at least one proximate vehicle to the host vehicle. The models are based on naturalistic datasets that approximate human behavioral outcomes. Accordingly, a model is selected to affect an approximation of what a human driver may do given the relative position of proximate vehicles to the host vehicle.

In one embodiment, two or more vehicles may be identified as proximate vehicles including a first vehicle and a second vehicle. Accordingly, a first vehicle model and a second vehicle model may be selected corresponding to the first vehicle and the second vehicle, respectively. For example, suppose that the first proximate vehicle is a preceding vehicle relative to the host vehicle. A preceding vehicle model would be selected to correspond to the first vehicle. The first vehicle may be deemed a preceding vehicle based on a preceding gap length. The preceding gap length may be a distance to a proximate vehicle ahead of the host vehicle. The preceding gap length is not purely a longitudinal measurement. For example, preceding gap length may incorporate proximate vehicles that are diagonally ahead of the host vehicle, such as when the host vehicle and proximate vehicle are in different lanes.

Likewise, the second vehicle may be a following vehicle relative to the host vehicle. Accordingly, a following vehicle may be selected corresponding to the second vehicle. The second vehicle may be deemed a following vehicle based on a following gap length. The following gap length may be a distance to a proximate vehicle behind the host vehicle. The following gap length is also not purely a longitudinal measurement. For example, following gap length, like the preceding gap length, may incorporate proximate vehicles that are diagonally behind of the host vehicle, such as when the host vehicle and proximate vehicle are in different lanes.

At block 706, the method includes calculating one or more merge factors corresponding to the one or more models. The one or more merge factors are calculated from the one or more models based on candidate factors and model coefficients, such as a following vehicle variable that has a binary value based on the at whether the at least one proximate vehicle includes a following vehicle.

At block 708, the method includes predicting a merge location based on the one or more merge factors. The predicted merge location may be selected by comparing the one or more merge factors to ranges and/or threshold values associated with potential merge locations. For example, the one or more merge factors may be compared to at least one threshold value, and a predicted merge location is predicted based on the comparison.

At block 710, the method includes adjusting a kinematic parameter of the host vehicle. For example, a kinematic parameter may be adjusted to bring the host vehicle within a merging distance of the predicted merge location. Suppose the host vehicle is a merging vehicle, the kinematic parameter may be adjusted to bring the merging vehicle laterally inline with the predicted merge location. For example, the kinematic parameter may be the speed of the host vehicle so as to cause the host vehicle to accelerate or decelerate to the predicted merge location. Alternatively, suppose that the host vehicle is a mainline vehicle, the kinematic parameter may be adjusted to create a gap at the predicted merge location.

The kinematic parameter may be adjusted by a control module 118. In some embodiments, the control module 118 may adjust the kinematic parameter with an advanced driver-assistance system or autonomous driving system (not shown). In another embodiment, the control module 118 may employ vehicle systems 122 such as the anti-lock brake system, the brake assist system, the automatic brake prefill system, the low speed follow system, or the cruise control system to adjust the kinetic parameter.

Figure 8:
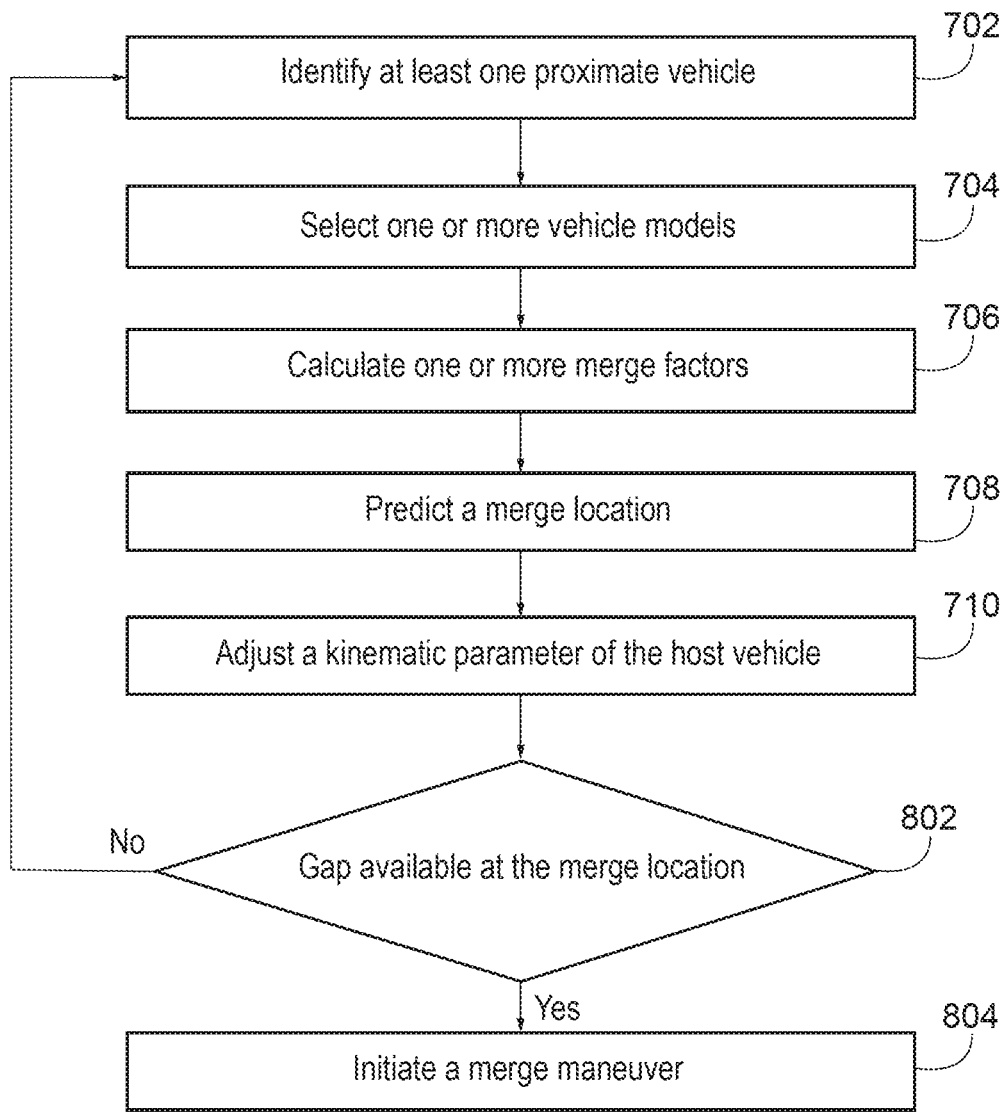
FIG. 8 is a process flow diagram of a method for predicting merge behavior including a gap determination according to an exemplary embodiment.

FIG. 8 is a process flow diagram of a method for predicting merge behavior from merging vehicles including a merge behavior model according to an exemplary embodiment. FIG. 8 has blocks 702-710 that are similar to those discussed with respect to FIG. 7 above and are described with respect to FIG. 5. The blocks 702-710 of FIG. 8 operate in a similar manner as those described above to FIG. 7. It is understood that the illustrative examples discussed herein are exemplary in nature and that host vehicles, models, and kinematic parameters can be implemented.

Continuing at block 802, the method includes determining whether a gap 514 exists at the predicted merge location 508. For example, the merge module 120 may use the vehicle sensors 134 including the host vehicle sensors 136 and/or the proximate vehicle sensors to determine if there is a gap of sufficient size at the predicted merge location. For example, the vehicle sensors 134 may be used to measure the gap length. The gap length may be measured between two proximate vehicles, a proximate vehicle and an obstacle (e.g., stopped traffic, end of lane, etc.), or two obstacles.

If a gap is not available at the predicted merge location, the method returns to block 702. At block 702, one or more proximate vehicles are identified on their current location relative to the host vehicle. If the gap is available at the predicted merge location, the method continues to block 804.

At block 804, a merge maneuver is initiated. The merge module 120 may employ an autonomous driving system or an advanced driver-assistance system to initiate the merge maneuver. Initiating a merge maneuver may include one or more of triggering an audio cue (e.g., sound alert, vocal alert, etc.), triggering a visual cue (e.g., a lighting sequence, display 132, heads-up-display projection, etc.), facilitating a merge movement (e.g., changing lanes, moving into the sufficient gap, etc.). By facilitating the merge maneuver, the systems and methods described here provide an improved driver experience. Furthermore, because the modeling is based on naturalistic behavior datasets, the facilitated merge maneuver approximates the vehicle occupant's behavior.

Figure 9:
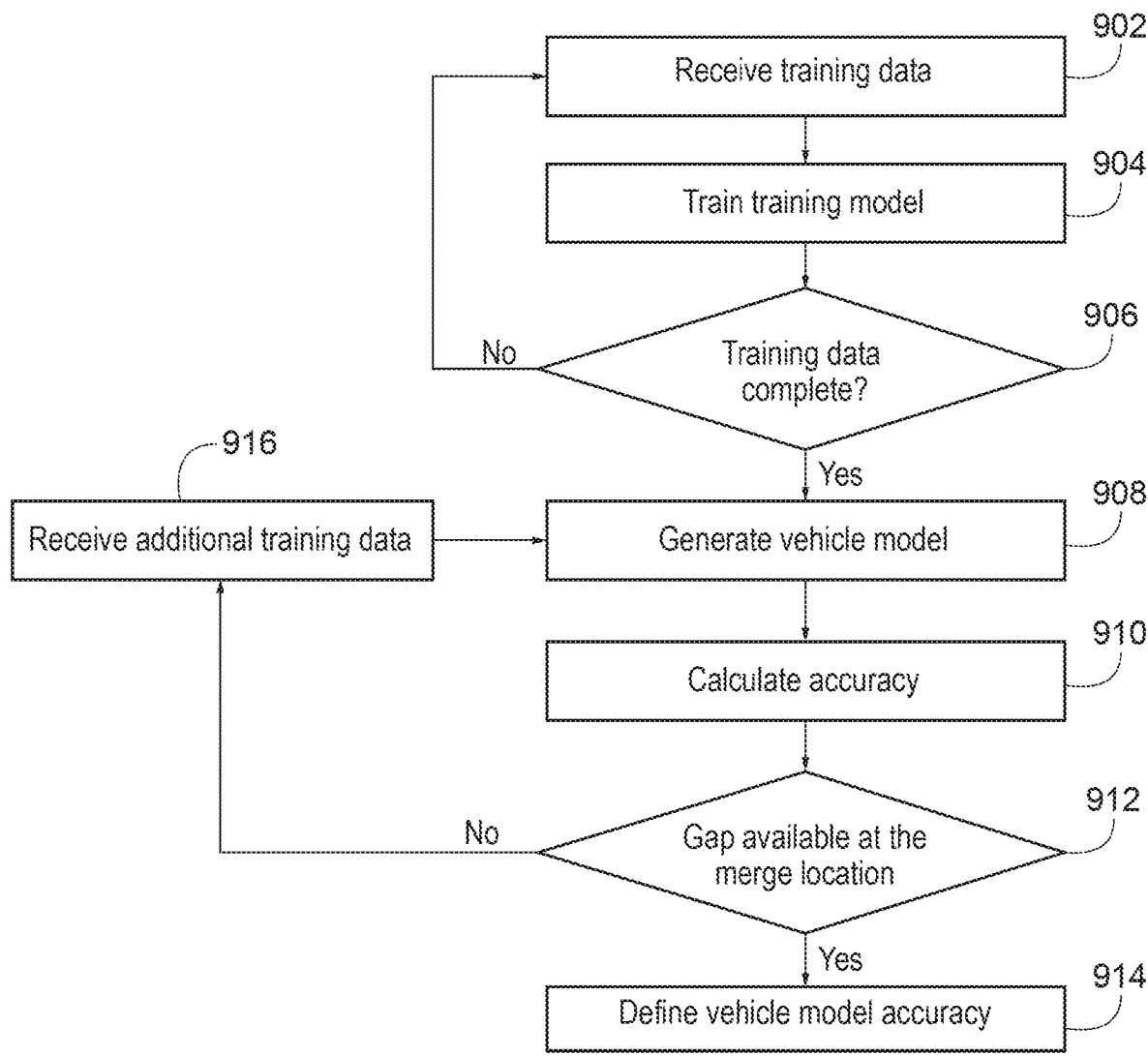
FIG. 9 is a process flow diagram of a method for training a vehicle model according to an exemplary embodiment.

FIG. 9 is a process flow diagram of a method for training a vehicle model according to an exemplary embodiment. For example, in some embodiments, the prediction module 116 may additionally generate, build, and refine the vehicle models based on received training data. It is understood that the illustrative examples discussed herein are exemplary in nature and that varying training data and vehicle models can be implemented.

At block 902, the method includes receiving training data. The training data includes naturalistic data. The naturalistic data may be received from the naturalistic behavior database 142 via the network 140, remote sensors (e.g. traffic camera, in-pavement sensors, vehicle-to-vehicle networks, aerial image datasets, etc.) via the network 140, and the host vehicle sensors 136 that may monitor a vehicle occupant's behavior. For example, naturalistic data may be extracted from aerial image datasets of highway vehicles. This may involve searching through the raw time history data and identifying vehicles that changed from the merging lane into the right most main travel lane. Time history data for the merging vehicles and neighboring vehicles can then be isolated for subsequent analysis. The vehicle trajectory data included a number of variables that facilitate localizing each unique vehicle and deduce its size and kinematics. Examples for the trajectory data variables include per vehicle unique identification number, timing, GPS location, vehicle dimensions, velocity, current lane and surrounding vehicles identification numbers.

At block 904, the method includes generating a training model. The training model may be generated by extracting and calculating the candidate factors and model coefficients from the training data.

At block 906, it is determined whether the training model had sufficient training data to generate the model. For example, it may be determined whether the candidate factors and model coefficients were able to be calculated from the received training data. If not, the method returns to block 902 to re-receive training data to generate a training model. If the received training data was sufficient, the method continues to block 908.

At block 908, a vehicle model is generated based on the training model. The vehicle model may include both input from the training model as well as additional training models or the vehicle occupant's behavior.

At block 910, the accuracy of the vehicle model is calculated. The accuracy may be calculated based on the vehicle occupant's historical behavior, a comparison to real-time vehicle behavior, for example, on major roadways.

At block 912, when the vehicle model is implemented, it is determined whether a gap exists at the predicted merge location. The existence of the gap may be determined using the host vehicle sensors 136 and the proximate vehicle sensors 138. If a gap is detected, the method continues to block 914. At block 914, the method includes defining the accuracy of the vehicle model. The accuracy may be defined based on the calculated accuracy and the success of the implemented vehicle model at block 912. If instead, the gap is not detected at block 912, the method continues to block 916. At block 916, the method receives additional training data. The additional training data is used to further refine the vehicle model. The method then returns to block 908. In this manner, the vehicle model can be refined to improve the accuracy, such that the vehicle model can better approximate human behavior.

While the merge behavior has been described with respect to a vehicle in an on-ramp lane that may be merging into mainline lane, it is to be understood that the vehicle models can also be employed for a host vehicle merging into an off-ramp lane or between mainline lanes.

Figure 10:
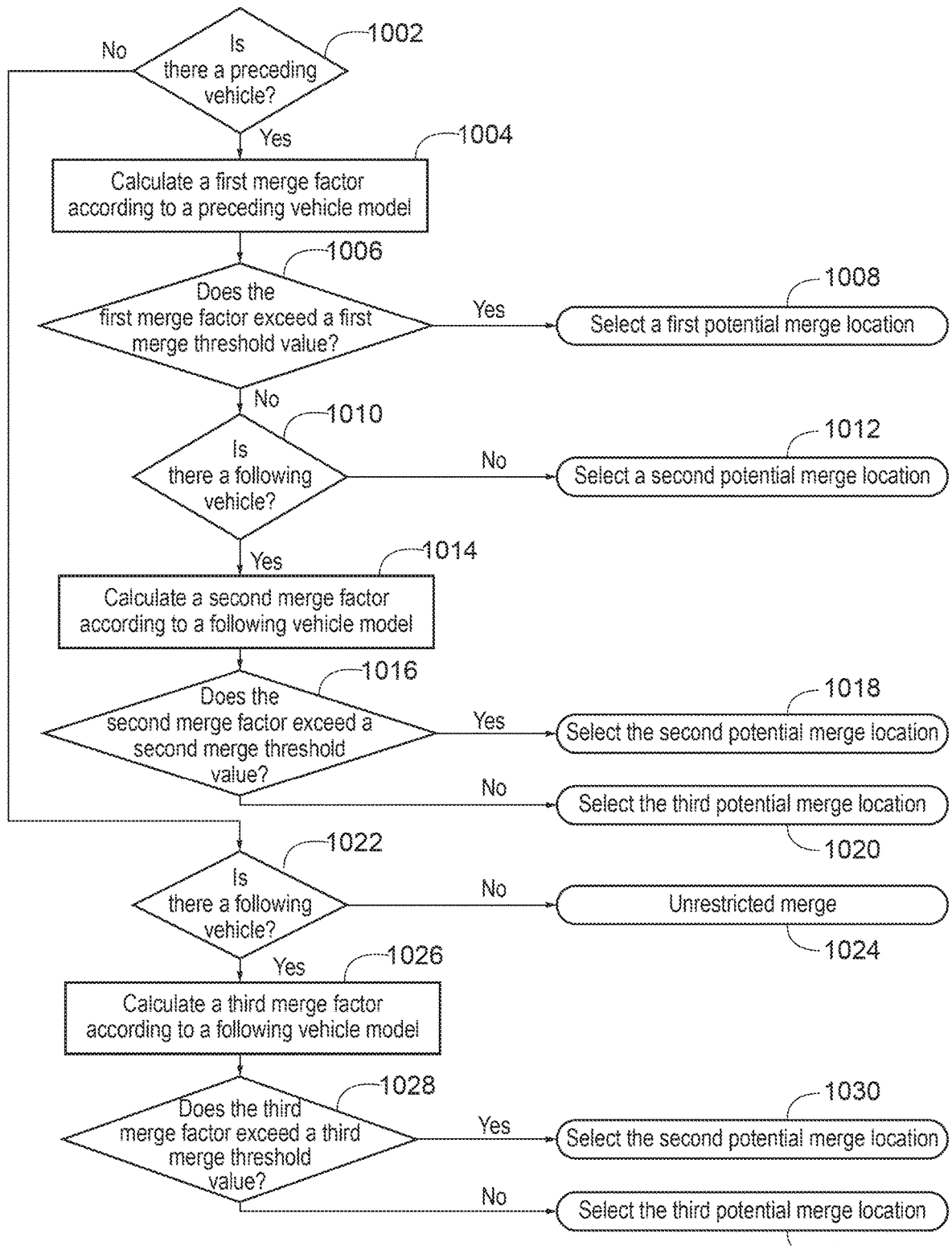
FIG. 10 is a process flow diagram of a method for predicting merge behavior according to an exemplary embodiment.

FIG. 10 is a process flow diagram of a method for predicting merge behavior according to a behavior model that combines a preceding vehicle model and a following vehicle model. The behavior model is described with respect to FIGS. 1 and 4. It is understood that the illustrative examples discussed herein are exemplary in nature and that varying host vehicles, vehicle models, and kinematic parameters can be implemented.

At block 1002, the method includes determining whether there is a preceding vehicle in the mainline lane 406 that is within the sensor range of the host vehicle and adjacent to the merging lane 404. For example, suppose the host vehicle is merging vehicle 402. Accordingly, the mainline vehicle 408 precedes the merging vehicle 402. If the identification module 114 senses and identifies a preceding vehicle, such as mainline vehicle 408, the method continues to block 1004. In some embodiments the identification of a preceding vehicle would exclude vehicle 408 if the distance to vehicle 402 is greater than a distance threshold. The distance threshold is a predetermined distance (e.g., 300 ft) from the host vehicle to a proximate to vehicle.

At block 1004, the method includes calculating a first merge factor according to a preceding vehicle model. The merge factor may be calculated in a similar manner as described with respect to FIG. 4.

At block 1006, the method includes the prediction module 116 determining whether the first merge factor exceeds a first merge threshold value. The first merge threshold may be a probability value such as 0.5. If the first merge factor exceeds the first merge threshold value, the method continues to block 1008.

At block 1008, the method includes selecting a first potential merge location 410. The first potential merge location 410 is a location that is ahead of the mainline vehicle 408.

Returning to block 1006, if the first merge factor does not exceed the first merge threshold, the method continues to block 1010.

At block 1010, the method includes determining whether there is a following vehicle in the mainline lane 406 that is within the sensor range and, in some embodiments, the distance threshold. Whether a vehicle is following is determined relative to the merging vehicle 402. If the identification module 114 does not identify a following vehicle, such as following vehicle 416, the method continues to block 1012.

At block 1012, the method includes selecting a second potential merge location 412. The second potential merge location 412 is a location that is behind the mainline vehicle 408.

Returning to block 1010, if the identification module 114 does identify a following vehicle, such as following vehicle 416, the method continues to block 1014.

At block 1014, the method includes calculating a second merge factor according to a following vehicle model. The second merge factor may be calculated in a similar manner as described with respect to FIG. 4.

At block 1016, the method includes the prediction module 116 determining whether the second merge factor exceeds a second merge threshold value. Like the first merge threshold value, the second merge threshold value may be a probability value. In some embodiments, the second merge threshold value may be the same as the first merge threshold value, for example, the second merge threshold value may be 0.5. If the second merge factor exceeds the second merge threshold value, the method continues to block 1018.

At block 1018, the method includes selecting the second potential merge location 412. Because, at block 1010 a following vehicle 416 is identified, the second potential merge location 412 is located behind the mainline vehicle 408 and also ahead of the following vehicle 416.

Returning to block 1016, if the second merge factor does not exceed the second merge threshold value, the method continues to block 1020.

At block 1020, the method includes selecting a third potential merge location 414. The third merge location 414 is located behind the following vehicle 416.

Returning to block 1002, at block 1002 it was determined whether there was a preceding vehicle. If a preceding vehicle is not identified by the identification module 114, the method continues to block 1022.

At block 1022, the method includes determining whether there is a following vehicle in the mainline lane 406 that is within the sensor range of the hose vehicle, and in some embodiments a distance threshold to the host vehicle. Again, whether a vehicle is following is determined relative to the merging vehicle 402. If the identification module 114 does not identify a following vehicle, such as following vehicle 416, the method continues to block 1024.

At block 1024, the method includes determining that potential merge location is unrestricted. An unrestricted merge occurs when there are no vehicles present in the mainline lane 406 within the sensor range of vehicle 402, and in some embodiments, a possible distance threshold (e.g., 300 ft) to vehicle 402. Accordingly, the merging vehicle 402 can move from the merging vehicle 404 to the mainline lane without impeding or being impeded by a proximate vehicle. Accordingly, the prediction module 116 can select any potential merge location. Furthermore, a gap and corresponding gap length do not have to be identified or calculated before initiating a merge maneuver. Accordingly, in response to the prediction module 116 predicting an unrestricted merge, the merge module 120 of the merging vehicle 402 may be triggered to initiate a merge maneuver.

Returning to block 1022, if the identification module 114 does identify a following vehicle, such as following vehicle 416, the method continues to block 1026.

At block 1026, the method includes calculating a third merge factor according to a following vehicle model. The third merge factor may be calculated in a similar manner as described with respect to FIG. 4.

At block 1028, the method includes the prediction module 116 determining whether the third merge factor exceeds a third merge threshold value. Like the first merge threshold value and the second merge threshold value, the third merge threshold value may be a probability value. In some embodiments, the third merge threshold value may be the same as the first merge threshold value and/or second merge threshold value, for example, the third merge threshold value may be 0.5. If the third merge factor exceeds the third merge threshold value, the method continues to block 1030.

At block 1030, the method includes selecting the second potential merge location 412. Because, at block 1002 a preceding vehicle was not identified but at block 1010 a following vehicle 416 was identified, the second potential merge location 412 is located ahead of the following vehicle 416.

Returning to block 1028, if the third merge factor does not exceed the third merge threshold value, the method continues to block 1032.

At block 1032, the method includes selecting a third potential merge location 414. The third merge location 414 is located behind the following vehicle 416.

FIG. 10 describes one embodiment of a behavior model that uses both a preceding vehicle model and a following vehicle model. Here, the preceding vehicle model is applied first and the following vehicle model is incorporated subsequently. However, in another embodiment, the following vehicle model may be applied to the proximate vehicles first, and the preceding vehicle model may be applied to the proximate vehicles subsequently. Thus, the preceding vehicle model and the following vehicle model can be used individually or in combination to assist a host vehicle in initiating, and even completing, merge maneuvers.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A merge behavior system for assisting a host vehicle positioned in a merge lane that is adjacent a mainline lane, the merge behavior system comprising:
a processor;
an identification module, implemented via the processor, to identify a preceding vehicle positioned in the mainline lane ahead of the host vehicle and a following vehicle positioned in the mainline lane behind the host vehicle;
a prediction module, implemented via the processor, to:
select a behavior model, generated using machine learning based on naturalistic datasets that approximate human behavioral outcomes of the preceding vehicle and the following vehicle, wherein the behavior model includes a preceding vehicle model and a following vehicle model,
calculate one or more merge factors corresponding to the behavior model, wherein the one or more merge factors include a first merge factor based on the preceding vehicle model and a second merge factor based on the following vehicle model, and
predict a merge location based on the one or more merge factors; and
a merge module, implemented via the processor, to determine whether a gap at the predicted merge location is a sufficient size for the host vehicle, and in response to determining that the gap has the sufficient size, initiating a merge maneuver.

2. The merge behavior system of claim 1, wherein the behavior model is selected based on a relative location of the preceding vehicle and the following vehicle to the host vehicle.

3. The merge behavior system of claim 1, wherein the prediction module, implemented via the processor, is further to compare the one or more merge factors to at least one threshold value, and wherein predicted merge location is based on the comparison.

4. The merge behavior system of claim 1, wherein the preceding vehicle model is based, at least in part, on a preceding gap length between the host vehicle and the preceding vehicle, a host vehicle velocity, and a relative preceding velocity of the preceding vehicle relative to the host vehicle.

5. The merge behavior system of claim 4, wherein the preceding vehicle model incorporates a following vehicle variable that has a binary value based on the following vehicle in the mainline lane.

6. The merge behavior system of claim 1, wherein the following vehicle model is based, at least in part, on a following gap length between the host vehicle and the following vehicle, a host vehicle velocity, and a relative following velocity of the following vehicle relative to the host vehicle.

7. The merge behavior system of claim 1, further comprising a control module, implemented via the processor, to adjust a kinematic parameter of the host vehicle to bring the host vehicle within a merging distance of the predicted merge location.

8. The merge behavior system of claim 1, wherein the merge module, implemented via the processor, initiates the merge maneuver with an advanced driver-assistance system.

9. The merge behavior system of claim 1, wherein in response to determining that the gap does not have a sufficient size, initiating the prediction module, implemented via the processor, to predict an updated merge location.

10. A merge behavior system for assisting a host vehicle positioned in a merge lane that is adjacent a mainline lane, the merge behavior system comprising:
a processor;
an identification module, implemented via the processor, to identify a preceding vehicle positioned in the mainline lane ahead of the host vehicle, and a following vehicle positioned in the mainline lane behind the host vehicle;
a prediction module, implemented via the processor, to:
select a behavior model generated using machine learning that incorporate naturalistic datasets that approximate human behavioral outcomes for a relative location of the preceding vehicle and the following vehicle to the host vehicle, wherein the behavior model includes a preceding vehicle model and a following vehicle model,
calculate one or more merge factors corresponding to the behavior model, wherein the one or more merge factors include a first merge factor based on the preceding vehicle model and a second merge factor based on the following vehicle model, and
predict a merge location based on the one or more merge factors corresponding to the behavior model;
a control module, implemented via the processor, to adjust a kinematic parameter of the host vehicle to bring the host vehicle within a merging distance of the predicted merge location; and
a merge module, implemented via the processor, to determine whether a gap at the predicted merge location is a sufficient size for the host vehicle, and in response to determining that the gap has a sufficient size, initiating a merge maneuver.

11. The merge behavior system of claim 10, wherein the kinematic parameter is a velocity of the host vehicle.

12. The merge behavior system of claim 10, wherein in response to determining that the gap does not have a sufficient size, initiating the prediction module, implemented via the processor, to predict an updated merge location.

13. A computer-implemented merge behavior method for assisting a host vehicle positioned in a merge lane that is adjacent a mainline lane, the merge behavior method comprising:
- identifying a preceding vehicle positioned in the mainline lane ahead of the host vehicle, and a following vehicle positioned in the mainline lane behind the host vehicle;
- selecting a behavior model generated using machine learning based on naturalistic datasets that approximate human behavioral outcomes for the preceding vehicle and the following vehicle, wherein the behavior model includes a preceding vehicle model and a following vehicle model;
- calculating one or more merge factors corresponding to the behavior model, wherein the one or more merge factors include a first merge factor based on the preceding vehicle model and a second merge factor based on the following vehicle model,
- predicting a merge location based on the one or more merge factors;
- adjusting a kinematic parameter of the host vehicle to bring the host vehicle within a merging distance of the predicted merge location;
- determining whether a gap at the predicted merge location is a sufficient size for the host vehicle; and
- initiating a merge maneuver in response to determining that the gap has a sufficient size.

14. The computer-implemented merge behavior method of claim 13, wherein the behavior model is selected based on a relative location of the preceding vehicle and the following vehicle to the host vehicle.

15. The computer-implemented merge behavior method of claim 13, further comprising comparing the one or more merge factors to at least one threshold value, and wherein predicted merge location is based on the comparison.

* * * * *